(12) United States Patent
Corbett et al.

(10) Patent No.: US 11,543,821 B2
(45) Date of Patent: Jan. 3, 2023

(54) TRACK STAND CAPABLE AUTONOMOUS ELECTRONIC BICYCLE

(71) Applicant: Weel Autonomy Inc., Seattle, WA (US)

(72) Inventors: Justin Allan Corbett, Bothell, WA (US); David Carlyle Hansen, Mercer Island, WA (US); Dylan Meehan, Seattle, WA (US)

(73) Assignee: WEEL AUTONOMY INC., Walnut, CA (US)

( * ) Notice: Subject to any disclaimer, the term of this patent is extended or adjusted under 35 U.S.C. 154(b) by 311 days.

(21) Appl. No.: 17/006,528

(22) Filed: Aug. 28, 2020

(65) Prior Publication Data

US 2022/0066448 A1    Mar. 3, 2022

(51) Int. Cl.
| | | |
|---|---|---|
| *B60L 9/00* | (2019.01) | |
| *G05D 1/00* | (2006.01) | |
| *B62M 6/40* | (2010.01) | |
| *B62K 11/00* | (2006.01) | |
| *B62J 45/40* | (2020.01) | |
| *B62J 43/10* | (2020.01) | |

(52) U.S. Cl.
CPC ............ *G05D 1/0088* (2013.01); *B62J 45/40* (2020.02); *B62K 11/007* (2016.11); *B62M 6/40* (2013.01); *B62J 43/10* (2020.02)

(58) Field of Classification Search
CPC ..... G05D 1/0088; B62K 11/007; B62J 45/40; B62J 43/10; B62M 6/40
See application file for complete search history.

(56) References Cited

U.S. PATENT DOCUMENTS

| | | | |
|---|---|---|---|
| 8,430,192 B2 † | 4/2013 | Gillett | |
| 10,245,937 B2 † | 4/2019 | Gillett | |
| 2019/0250619 A1 | 8/2019 | Gillett | |
| 2020/0409381 A1* | 12/2020 | Corbett | ................. B62K 21/00 |
| 2021/0139103 A1* | 5/2021 | Gillett | ............... B60W 60/0053 |

OTHER PUBLICATIONS

Third Party Submission under 37 CFR 1.290, Submitted by Carla R. Gillett for U.S. Appl. No. 17/006,555, filed Jul. 17, 2022, 39 pages.
Third Party Submission under 37 CFR 1.290, Submitted by Carla R. Gillett for U.S. Appl. No. 17/006,528, filed Jul. 7, 2022, 33 pages.

(Continued)

*Primary Examiner* — Adam M Alharbi
(74) *Attorney, Agent, or Firm* — Fenwick & West LLP

(57) ABSTRACT

An autonomous electronic bicycle comprises a frame, a front wheel that can be powered by a first electronic motor, a rear wheel that can be powered by a second electronic motor, and handlebars that can steer the front wheel which can be controlled by a third electronic motor. The autonomous electronic bicycle can operate autonomously, traveling to a chosen destination. When operating autonomously the autonomous electronic bicycle can shift between a set of balance modes, including a mode used when moving and a mode used when stationary but balanced. To transition between modes, a transition sequence of control commands can be selected and used.

20 Claims, 14 Drawing Sheets

(56) References Cited

OTHER PUBLICATIONS

Third Party Submission under 37 CFR 1.290, Submitted by Carla R. Gillett for U.S. Appl. No. 17/006,555, filed Jul. 7, 2022, 30 pages.
Third Party Submission under 37 CFR 1.290, Submitted by Carla R. Gillett for U.S. Appl. No. 17/591,841, filed Jul. 6, 2022, 51 pages.

* cited by examiner
† cited by third party

US 11,543,821 B2

TRACK STAND CAPABLE AUTONOMOUS ELECTRONIC BICYCLE

BACKGROUND

This disclosure relates generally to autonomous vehicles and more specifically to autonomous bicycle systems.

Many users have a need for on demand short distance transportation, for example for traveling between destinations within a city center when the user does not have transportation of their own. Currently, each available solution is either inconvenient or inflexible in providing this type of transportation service to a user. For example, traditional public transportation (such as buses and subway systems) may not provide service from the user's current location or to the desired destination. Similarly, taxi or rideshare services can be relatively expensive for short trips, can get stuck in traffic, and, because they are operated by a driver, remove the user's agency in choosing the route. Finally, public "bikeshare" services require either saturating the entire service area with many static pickup points (or large numbers of vehicles) at a large expense (both upfront and in continuing maintenece of a large fleet), or risk being unavailable at the user's current position. Therefore, a solution is needed to provide convenient, on-demand transportation to users without requiring the expense and loss of agency inherent in taxi or rideshare services.

Figure 1:
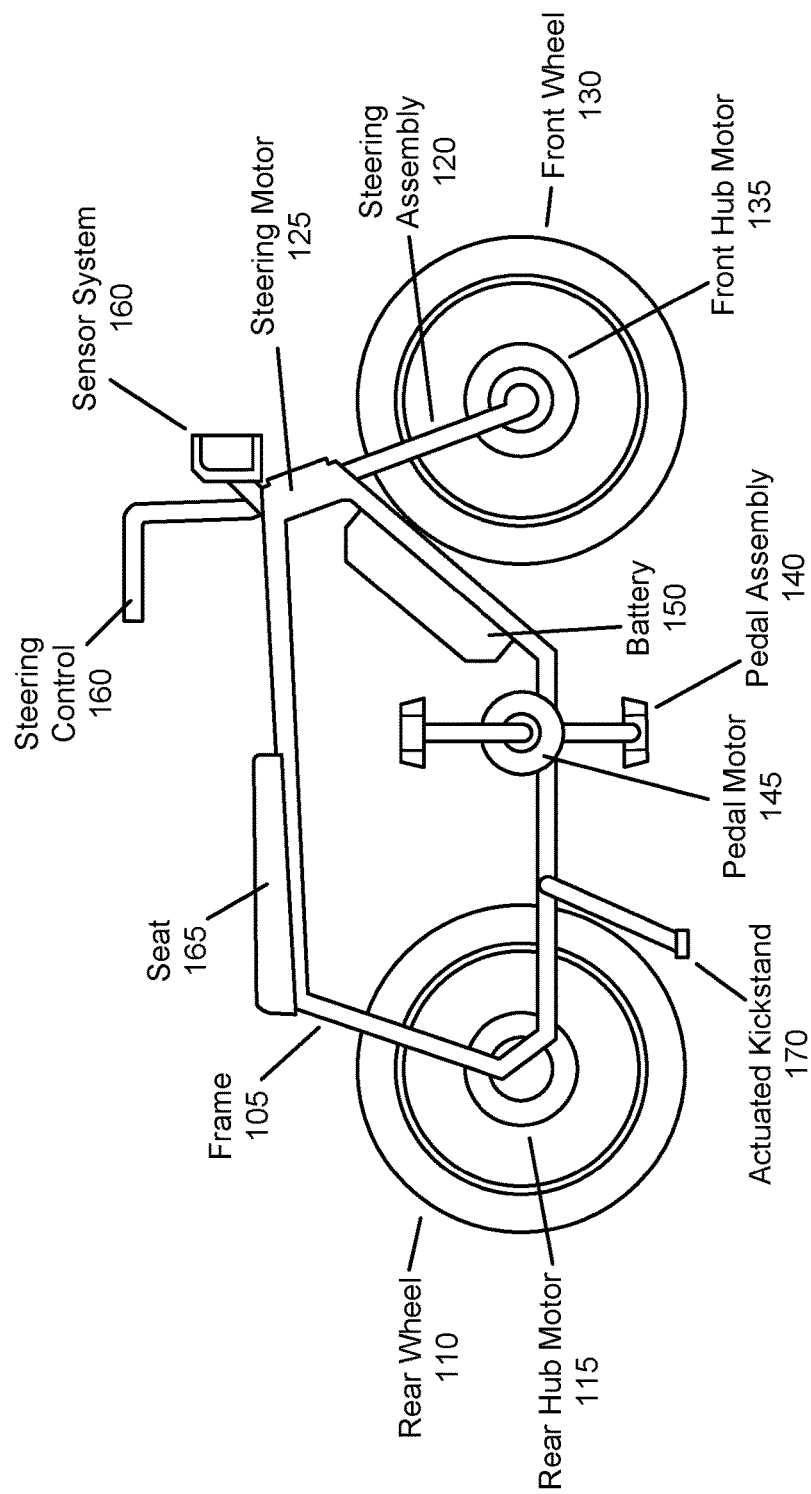
FIG. 1 illustrates example hardware components of an example autonomous electronic bicycle, according to an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

To provide a convenient transportation solution, an autonomous electronic bicycle system can provide bicycles on demand to a plurality of riders in a service area. The autonomous electronic bicycle system (here, an "AEB system") can operate using a plurality of autonomous electronic bicycles (here, "AEBs") which can autonomously deliver themselves to a requesting rider. After an AEB reaches the requesting rider, the rider can mount the AEB and manually pedal and ride to their ultimate destination. An AEB system provides the advantages of convenience to the rider due to reduced search time for an available vehicle and requires proportionally fewer vehicles to cover a given service area, as the autonomous electronic bicycles can reposition themselves as needed to provide optimal coverage. In some embodiments, potential riders can request an autonomous electronic bicycle using an application on a mobile device of the user. When a rider requests an AEB, the AEB system can dispatch one or more autonomous electronic bicycles towards a location provided by the user.

An AEB system can employ a fleet of autonomous electronic bicycles which are available for users to ride. In publicly available AEB systems (i e AEB systems providing autonomous electronic bicycle services to the public or other large groups of people using a shared fleet of AEBs), each individual autonomous electronic bicycle can be subjected to harsh operating conditions, rough handling (for example, by a rider or a pedestrian), and other causes of enhanced wear and tear. Therefore, embodiments of an AEB system can use autonomous electronic bicycles adapted to reduce the amount of needed maintenece or possibility of hardware failure, for example autonomous electronic bicycles with one or more direct drive motors to reduce maintenance overhead.

Electronic Bicycle Hardware

An electronic bicycle can be any bicycle in which some or all torque provided to the rear wheel is provided by an electronic motor (or similar propulsion system). When operated by a rider, the output torque can be proportional to an input power exerted by the rider on pedals of the electronic bicycle (e.g., based on a signal produced by pedals representative of a cadence of pedaling, a speed of pedaling, or a strength of pedaling by the rider). In some embodiments, an autonomous electronic bicycle (AEB) is an autonomous two-wheeled vehicle capable of operating autonomously without a rider. However, an AEB can be ridden by a rider as a traditional (non-autonomous) bicycle with or without electronic assistance, according to some embodiments. In some implementations, an AEB is "autonomous capable," that is, able to operate both in an "autonomous mode" without a rider or direct rider control and in a "manual mode" with direct input from a human rider of the autonomous electronic bicycle. For example, an autonomous electronic bicycle can use autonomous mode to navigate to a chosen destination where a rider is waiting. Once the AEB arrives at the rider, the rider can place the AEB in manual mode and ride it as a traditional bicycle. In some implementations, an AEB is a bicycle with two wheels, though an autonomous electronic bicycle can be any vehicle requiring lateral balance while in operation, such as a unicycle, scooter, recumbent bicycle, motorcycle, moped, or motor scooter.

FIG. 1 illustrates example hardware components of an example autonomous electronic bicycle, in accordance with an embodiment. The autonomous electronic bicycle 100 of FIG. 1 comprises a frame 105, seat 107, rear wheel 110, rear hub motor 115, steering assembly 120, steering motor 125, steering control 127, front wheel 130, front hub motor 135, pedal assembly 140, pedal motor 145, battery 150, sensor system 160, and actuated kickstand 170.

The autonomous electronic bicycle 100 (also referred to herein as the AEB 100) can include one or more "direct drive" electric motors operating various components of the autonomous electronic bicycle 100. As used herein, a direct drive motor is an electric motor mounted to the autonomous electronic bicycle 100 such that the shaft of the electric motor forms or is part of the axle on which the moveable component of the autonomous electronic bicycle 100 rotates. One characteristic of systems using direct drive motors is the lack of an intermediate mechanical power transmission system between the direct drive motor and the moving component. As the direct drive motor directly rotates the axle where the moving component is mounted, a system using a direct drive motor does not require the use of gears, transmissions, belt or chain drives, or other mechanical power transmission systems to transmit the force of the direct drive motor to the axle of the moveable component.

In some implementations, the use of a direct drive motor can reduce or largely eliminate mechanical contact between moving parts (for example, such that bearings are the only points of mechanical contact between the autonomous electronic bicycle 100 and a component with a direct drive motor). Therefore, the use of direct drive motors in an AEB 100 can provide durability benefits by enabling a design with less moving parts to break or wear (such as, by not requiring the use of a set of gears or a chain to transmit power) and further by reducing physical contact between moving parts of the AEB 100 (such as by eliminating mechanical power transmission systems). The durability advantages of direct drive motors are especially relevant in applications where the AEB 100 will be deployed commercially or otherwise open for public use. Autonomous electronic bicycles 100 using direct drive motors can require less frequent maintenance and may be harder to break through improper use, resulting in reduced operating costs and higher uptime for the autonomous electronic bicycle. In some implementations, the rear hub motor 115, steering motor 125, front hub motor 135, and pedal motor 145 of an AEB 100 are each direct drive motors.

The frame 105 of the autonomous electronic bicycle 100 can provide a base, platform, or frame for other components of the autonomous electronic bicycle 100 to attach to. In some embodiments, the frame 105 comprises a seat 107 (or multiple seats 107) that can accommodate one or more riders of the autonomous electronic bicycle 100. The frame 105 can be made of aluminum, steel, carbon fiber, or any other suitable material or combination of materials formed by any suitable method.

In the embodiment of FIG. 1, the frame 105 comprises an attachment for the rear wheel 110 of the autonomous electronic bicycle 100. The rear wheel 110 can be made of any suitable materials and can comprise a tire to provide traction on the ground surface which may be pneumatic, solid, or of any other suitable type. In some embodiments, the rear wheel 110 is powered by the rear hub motor 115, which can be integrated into the hub or axle of the rear wheel 110 and can be a direct drive motor. The rear hub motor 115 can be used to propel the autonomous electronic bicycle in a forward or reverse direction and/or to aid in balancing the autonomous electronic bicycle 100. The rear hub motor 115 can comprise one or more electric motors and can be geared or ungeared and use any suitable electronic motor technology, for example, the rear hub motor 115 can be a brushed or brushless DC motor, an AC motor, or of any other suitable type. In some implementations, the use of different types of electric motors can affect the final performance of the rear hub motor 115. For example, using an ungeared (or relatively ungeared) motor can allow the autonomous electronic bicycle 100 to better control the power applied through the rear hub motor 115, for example through the elimination of mechanical lash in the gearbox of a geared motor. However, ungeared motors may be less energy efficient than an equivalent geared motor. Similarly, as described above, the rear hub motor 115 can be configured as a direct drive motor, with the axle of the rear wheel 110 used as the shaft of the rear hub motor 115.

In some implementations, the rear hub motor 115 is additionally used to provide braking to the rear wheel 110. For example, the rear hub motor 115 use a regenerative braking system to return power to the battery 150 while providing braking force to the rear wheel 110. Similarly, the rear hub motor 115 can use a dynamic braking system, dissipating the excess energy to the frame, or, in emergency situations, through shorting the rear hub motor 115, according to some embodiments. Other embodiments of the rear wheel 110 can incorporate traditional mechanical brakes (for example, bicycle disc or rim brakes) in place of or in addition to the use of the rear hub motor 115 as an electronic brake.

Further, in some embodiments, the rear hub motor 115 drives the rear hub of the rear wheel 110 without being integrated into the hub itself. For example, the rear hub motor 115 can drive the rear wheel 110 through a chain or belt drive (such as in a single gear traditional bicycle chain drive). In other embodiments, the rear hub motor 115 is integrated into the hub of the rear wheel 110, but the hub of the rear wheel 110 is also connected to the pedal assembly 140 through a chain or belt drive, for example, to allow a rider of the autonomous electronic bicycle 100 to provide mechanical power to the rear wheel 110 with or without the assistance of the rear hub motor 115 (such when the autonomous electronic bicycle 100 is operated by a rider in manual mode).

The frame 105 can additionally be connected to a steering assembly 120, for example, a bicycle fork enabling the front wheel 130 to be steered relative to the frame 105, in the embodiment of FIG. 1. The steering assembly 120 can articulate relative to the frame 105 on one or more pivot points. For example, the steering assembly 120 can include a steerer tube which mates with a head tube of the frame 105, providing an axle for the rotation of the steering assembly 120 relative to the frame 105. The steering assembly 120 can be aluminum, steel, carbon fiber, or any other suitable material or combination of materials as described above. In some embodiments, the steering assembly 120 comprises a steering control 127, such as handlebars or another mechanism allowing a rider of the autonomous electronic bicycle 100 to control the steering angle of the front wheel 130 relative to the frame 105.

The steering assembly 120 can also be electronically controlled through the steering motor 125, which can articulate the steering assembly 120 (and therefore the front wheel 130) through a range of steering angles. The steering motor 125 can comprise one or more electric motors and can be geared or ungeared and use any suitable electronic motor technology, for example, the steering motor 125 can be a brushed or brushless DC motor, an AC motor, or of any other suitable type. In implementations where the autonomous electronic bicycle 100 is human-rideable, the steering motor 125 is configured to ensure that the steering assembly 120 remains a compliant actuator to user input. In some embodiments, the steering motor 125 is ungeared or minimally geared to minimize the drag provided to the steering assembly 120 when manually turned by a rider of the autonomous electronic bicycle 100. Similarly, an ungeared steering motor 125 can be intentionally oversized to improve performance when turning the steering assembly 120 at low speeds. As described above, the steering motor 125 can be configured as a direct drive motor, with the steerer tube of the steering assembly 120 used as the shaft that the steering motor 125 is built around. In some embodiments, a direct drive steering motor 125 can be built into the head tube of the frame 105 and turn the steerer tube of the steering assembly 120 to actuate the steering of the AEB 100.

In some embodiments, the steering motor 125 is additionally used to actively damp the steering of the autonomous electronic bicycle 100 when ridden by a human rider in manual (rider-controlled) mode. The use of the steering motor 125 for active damping enables the steering assembly 120 to be optimized for autonomous operation while maintaining rideability for a human rider. For example, the head angle (the angle of the head tube of the frame 105) of the steering assembly 120 and frame 105 can be steepened to provide additional responsiveness when operating autonomously, however, the steering motor 125 can be manually used to damp the steering of the autonomous electronic bicycle 100, simulating a slacker (more stable) head angle for a human rider. Similarly, some implementations use a "steer by wire" system for controlling the steering assembly 120 via the steering control 127. In a steer by wire implementation, the steering control 127 is not mechanically linked to the front wheel 130 and rider steering is accomplished by measuring the rider input to the steering control 127 and applying proportional output to the steering assembly 120 (for example, by the steering motor 125) to simulate a mechanical linkage between the steering control 127 and the steering assembly 120.

The front wheel 130, like the rear wheel 110, can be any suitable material, size, and tire type, however, the front wheel 130 may be a different sizes or width than rear wheel 110. In some embodiments, the front wheel 130 is powered by the front hub motor 135. Similar to the rear hub motor 115 and the steering motor 125, the front hub motor 135 can comprise one or more electric motors and can be geared or ungeared and use any suitable electronic motor technology, for example, the front hub motor 135 can be a brushed or brushless DC motor, an AC motor, or of any other suitable type. In some embodiments, the front hub motor 135 and the steering motor 125 are the primary inputs used to control the balance of the autonomous electronic bicycle 100. Therefore, a responsive motor (such as an ungeared brushless DC motor) can be used for the front hub motor 135 to enable the autonomous electronic bicycle 100 to make fine adjustments to its balance/lean angle. Like the rear hub motor 115, the front hub motor 135 can be used for electronic braking as well (through dynamic braking, regenerative braking, or any suitable method as explained above), and/or the front wheel 130 may comprise a mechanical braking system. As described above, the front hub motor 135 can be configured as a direct drive motor, with the axle of the front wheel 130 used as the shaft of the front hub motor 135.

The pedal assembly 140, according to some embodiments, allows a human rider of the autonomous electronic bicycle 100 to manually propel or otherwise provide power to the autonomous electronic bicycle 100. In some implementations, a "virtual pedal" system is used in which the pedal assembly 140 is not directly connected to the rear wheel 130 (e.g., via a chain). Instead, the pedal assembly 140 can be connected to the pedal motor 145, acting as a generator to provide resistance which the user can pedal against while generating power for the autonomous electronic bicycle 100. The resulting electrical power from the user's pedaling can be stored or used to power (or partially power) the autonomous electronic bicycle 100. In some embodiments, the rider of the autonomous electronic bicycle 100 can additionally or alternatively control the speed of the autonomous electronic bicycle 100 through a throttle or other speed control input. In these cases, the autonomous electronic bicycle 100 may not have the pedal assembly 140 or pedal motor 145. The pedal motor 145 can additionally be used to manipulate the pedal assembly 140 when in autonomous mode, for example, to avoid striking the pedals on obstacles when passing by in autonomous mode. As described above, the pedal motor 145 can be configured as a direct drive motor, with an axle of the pedal assembly 140 (such as the axle the crank arms and pedals are attached to) used as the shaft of the pedal motor 140.

In other embodiments, the pedal assembly 140 is connected mechanically to the rear wheel 130, for example with a chain or belt drive as described above.

The autonomous electronic bicycle 100 can comprise a battery 150 which can provide power to one or more components of the autonomous electronic bicycle 100, such as the front and rear hub motors 135 and 115 and the steering motor 125. The battery 150 can be a single battery or any suitable combination of batteries and/or other power storage devices (such as capacitors). In some embodiments, the battery 150 can send or receive power from one or more of the motors of the autonomous electronic bicycle 100, for example, from harvesting power from the pedal motor 145 (such, through the virtual pedal system), or from the rear wheel motor 115 through regenerative braking.

The autonomous electronic bicycle 100 can include a sensor system 160 including sensors capable of gathering information about the position of and environment around the autonomous electronic bicycle 100, for example, for use in autonomous mode. The sensor system 160 can include any suitable sensor or suite of sensors and, although the sensor system 160 is represented as a single unit in FIG. 1, the sensors of the sensor system 160 can be located at any suitable position on the autonomous electronic bicycle 100 either grouped together or distributed in any suitable manner. For example, the sensor system 160 can comprise GPS sensors, gyroscopes or other orientation sensors, accelerometers, IMUs (Inertial Measurement Units), magnetometers, motion detectors, pedal and motor position sensors, SLAM (Simultaneous Localization and Mapping) or VSLAM (Visual Simultaneous Localization and Mapping) systems, depth sensors, curb feelers, and any other suitable sensors, each configured to produce a signal representative of a characteristic of the bicycle (such as a location of the bicycle, a position or orientation of the bicycle, a surrounding of the bicycle, and the like).

In some implementations, the autonomous electronic bicycle 100 can include an actuated kickstand 170 which may enable the bike to stop and start in autonomous mode without falling over. For example, the actuated kickstand 170 can comprise a linear actuator or electronic motor used to extend and retract the kickstand depending on the current situation. For example, the autonomous electronic bicycle 100 can retract the actuated kickstand 170 in response to transitioning (or preparing to transition) from a stop to movement and can extend the actuated kickstand 170 in response to transitioning from autonomous movement to an inactive state (for example, when parking or otherwise indefinitely stopping autonomous motion. In other embodiments, the autonomous electronic bicycle can use a track stand (a stationary two-wheel balance) to pause or temporarily stop. For example, when the autonomous electronic bicycle is waiting for short lengths of time to cross through an intersection. Similarly, the autonomous electronic bicycle 100 can comprise other systems the autonomous electronic bicycle 100 in locomotion or balance, for example, a center of gravity shift mechanism allowing the autonomous electronic bicycle 100 to actively change the center of gravity to aid in balancing.

Figure 2:
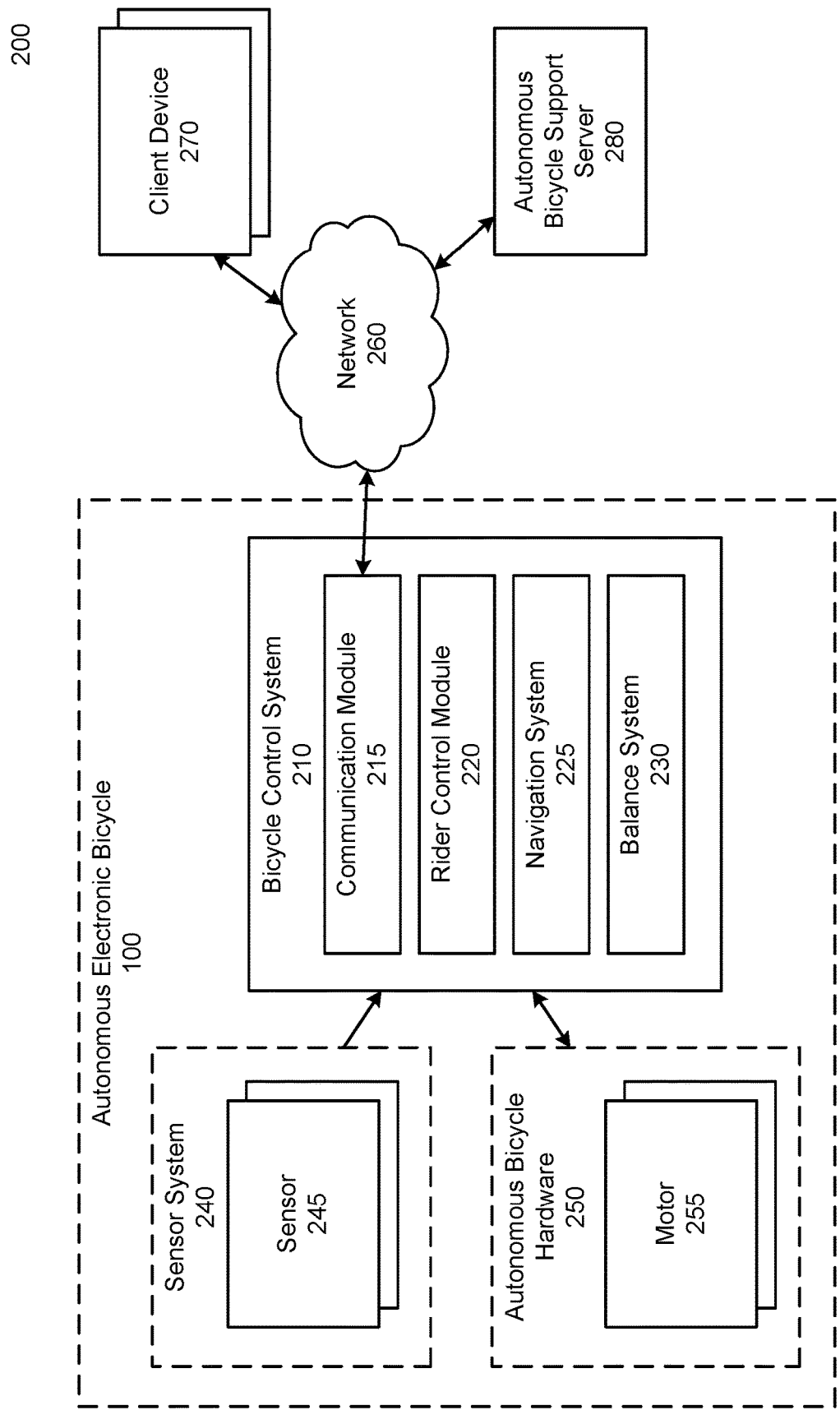
FIG. 2 is a block diagram of an environment in which an autonomous electronic bicycle operates, according to an embodiment.

In some implementations, the autonomous electronic bicycle 100 is be controlled by a bicycle control system (or a controller or other processor of the bicycle) which can control one or more components of the autonomous electronic bicycle 100 based on input or signals from the sensor system 160, the pedal assembly 140, and/or communications with third parties or servers associated with the autonomous electronic bicycle 100. FIG. 2 is a block diagram of an environment in which an autonomous electronic bicycle operates, in accordance with an embodiment. The environment 200 of FIG. 2 comprises an autonomous electronic bicycle 100 communicatively connected one or more client devices 270 and the autonomous vehicle support server 280 over a network 260. In alternative configurations, different and/or additional components may be included in the environment 200.

The autonomous electronic bicycle 100 of FIG. 2 can be an autonomous electronic bicycle 100 as illustrated in FIG. 1 or any other suitable autonomous vehicle. In the embodiment of FIG. 2, the autonomous electronic bicycle 100 includes a bicycle control system 210, a sensor system 240 with one or more sensors 245, and autonomous bicycle hardware 250 including one or more electronically controllable systems of the autonomous electronic bicycle 100, such as the motor 255, but which can also include any suitable motor, battery, actuator, or other system connected to and/or controlled by the bicycle control system 210.

The bicycle control system 210 is a computer system, microcontroller, processor, mobile device, electronic circuit or system, or other computing component mounted on the autonomous electronic bicycle 100 that is capable of operating the autonomous electronic bicycle 100 (for example, in manual and/or autonomous modes). In the embodiment of FIG. 2, the bicycle control system 210 comprises a communication module 215, a rider control module 220, a navigation system 225, and a balance system 230.

In some implementations, the communication module 215 facilitates communications of the bicycle control system 210 over the network 260 using any suitable communication protocol. For example, the bicycle control system 210 can communicate with one or more client devices 270 over the network, for example to enable the autonomous electronic bicycle 100 to be controlled by a user of the client device 270, or for any other suitable reason. Similarly, the communication module 215 can communicate with the autonomous electronic bicycle support server 280 over the network 260. For example, the bicycle control system 210 can receive a destination for autonomous travel from the autonomous electronic bicycle support server 280. The network 260, client device 270, and the autonomous electronic bicycle support server 280 will be discussed further below.

In some implementations, the navigation system 225 and balance system 230 are active when the autonomous electronic bicycle 100 is in autonomous mode and inactive when the autonomous electronic bicycle 100 is in manual mode. Similarly, the rider control module 220 can be inactive while the autonomous electronic bicycle 100 is in autonomous mode and active when the autonomous electronic bicycle 100 is in manual mode. In some embodiments, the rider control unit 220 can additionally be used to control the autonomous electronic bicycle 100 remotely while in autonomous mode. For example, the autonomous electronic bicycle 100 can be remotely controlled (in some embodiments, by a remote operator connected to the autonomous bicycle support server 280) to perform maneuvers the autonomous electronic bicycle 100 cannot perform autonomously (such as unprotected left turns across traffic).

The rider control module 220 can, in some embodiments, control functions of the autonomous electronic bicycle 100 used when the being autonomous electronic bicycle 100 is in manual mode. For example, the rider control module 220 can manipulate the autonomous bicycle hardware 250 to alter the handling characteristics of the autonomous electronic bicycle 100 to provide a better riding experience for a human rider. For example, the rider control module 220 can electronically damp rider steering inputs to simulate more stable riding characteristics than provided by the physical design of the autonomous electronic bicycle 100. For example, as described above, the steering motor 125 can be used to simulate a more stable steering response than natural based on the design of the autonomous electronic bicycle 100. Similarly, in implementations using steer by wire rider steering controls, the rider control module 220 can magnify certain rider steering inputs or otherwise actively stabilize the autonomous electronic bicycle 100. Additionally, the rider control module 220 can power one or more of the front and rear hub motors 135 and 115 in response to rider inputs to drive the autonomous electronic bicycle 100. For example, the rider control module 220 can output power proportional to a power output by a user through the pedal assembly 140 to one or more of the front and rear hub motors 135 and 115. The rider control module 220 will be discussed further below in relation to FIG. 10.

The navigation system 225 can, in some embodiments, select a target pose for the autonomous electronic bicycle 100 to achieve. As used herein a "pose" of the autonomous electronic bicycle 100 represents a state of the autonomous electronic bicycle 100 at a specific time. For example, a pose of the autonomous electronic bicycle 100 can include a position of the frame 105 in 4D space (that is, an XYZ coordinate position and a time), a heading of the autonomous electronic bicycle 100, a heading rate (i.e. the speed at which the autonomous electronic bicycle 100 is turning), a velocity and/or acceleration of the autonomous electronic bicycle 100, a lean angle of the autonomous electronic bicycle 100, and any other suitable information about the state of the autonomous electronic bicycle. A pose can also include a relative or absolute position and/or orientation of one or more additional components of the autonomous electronic bicycle 100, for example an orientation of the front wheel 130 relative to the frame 105, or an angle of rotation of the pedal assembly 140. According to some implementations, the pose of the autonomous electronic bicycle 100 is measured relative to a point on the frame 105, and therefore does not account for any moving parts of the autonomous electronic bicycle 100 such as the front wheel 130 and steering assembly 120, which may be, in these embodiments, measured relative to the position and orientation of the frame 105. In some embodiments, the pose of the autonomous electronic bicycle 100 is measured from a known origin point, for example, a point on the frame 105 of the autonomous electronic bicycle 100 or an external reference point such as a location destination, an external object or location within the vicinity of the autonomous electronic bicycle 100, or the like. In some implementations, a pose of the autonomous electronic bicycle 100 can be represented as a quaternion. According to some embodiments, the target pose determined by the navigation system 225 comprises a target heading rate and target velocity of the autonomous electronic bicycle 100.

In some embodiments, the navigation system 225 can select a target pose for the autonomous electronic bicycle 100 based on a determined destination and route to the destination. In some embodiments, the destination is a target point and the route is a set of high level instructions to reach that point. For example, the destination can be a certain address and the route can be a set of turn by turn instructions including a set series of streets and turns to follow when traveling to the address. In some implementations, the destination and/or the route is determined internally by the bicycle control system 210 or, in other implementations, one or both of the destination and the route are provided by an external system such as the autonomous bicycle support server 280. For example, the destination may be provided by a client device 270 or the autonomous electronic bicycle support server 280, and the route can be determined by the autonomous electronic bicycle support server 280 using a third-party service.

When in autonomous mode, the balance system 230 can take a target pose from the navigation system 225 and control the autonomous bicycle hardware 250 towards achieving the target pose while maintaining balance of the autonomous electronic bicycle 100. For example, the balance system 230 can set the output torque of one or more of the hub motors 115 and 135 and the steering motor 125 to move the autonomous electronic bicycle 100 towards the target pose. In some implementations, the balance system 230 can modify a received target pose from the navigation system 225 (or generate a new target pose) to maintain the balance of the autonomous electronic bicycle 100. For example, the navigation system 225 can alter the target pose based on the current pose, the current acceleration, or any other factor that may impact the balance of the autonomous electronic bicycle 100. The balance system 230 will be discussed further below.

The network 260 is a network connecting the autonomous electronic bicycle 100 with the client devices 270 and/or the autonomous bicycle support server 280. The network 260 may comprise any combination of local area and/or wide area networks, using both wired and/or wireless communication systems. In one embodiment, the network 260 uses standard communications technologies and/or protocols. For example, the network 260 can include communication links using technologies such as Ethernet, 3G, 4G, CDMA, WIFI, and Bluetooth. Data exchanged over the network 260 may be represented using any suitable format, such as hypertext markup language (HTML) or extensible markup language (XML). In some embodiments, all or some of the communication links of the network 260 may be encrypted using any suitable technique or techniques.

Each client device 270 can be a computing device capable of receiving user input as well as transmitting and/or receiving data via the network 260. In some embodiments, a client device 270 is a device having computer functionality, such as a mobile telephone, a smartphone, or another suitable device. In one embodiment, a client device 270 executes an application or web application allowing a user of the client device 270 to interact with the autonomous electronic bicycle 100 or the autonomous bicycle support server 280. In another embodiment, a client device 270 interacts with the autonomous electronic bicycle 100 or the autonomous bicycle support server 280 through an application programming interface (API) running on a native operating system of the client device 270. In some implementations, a user of the client device 270 can request use of an autonomous electronic bicycle 100 through an app or website over the network 260. Similarly, the destination can be a location provided by a potential rider through a mobile application running on a client device 270. In some implementations, an autonomous electronic bicycle 100 then autonomously drives itself to (or near to) the user of the client device 270 or another specified destination in autonomous mode. The user of the client device 270 can then place the autonomous electronic bicycle 100 in manual mode and ride the autonomous electronic bicycle 100 as needed.

The autonomous electronic bicycle support server 280 can be any suitable server, server cluster, or cloud-based server capable of communication with and support of one or more autonomous electronic bicycles 100. In some embodiments, the autonomous electronic bicycle support server 280 can provide navigation instructions and/or route information to an autonomous electronic bicycle. Similarly, the autonomous electronic bicycle support server 280 can provide object recognition processing or other functions of the navigation system 225 remotely, according to some embodiments. For example, when the additional lag introduced by sending data to the autonomous electronic bicycle support server 280 would not present safety concerns.

Figure 3A:
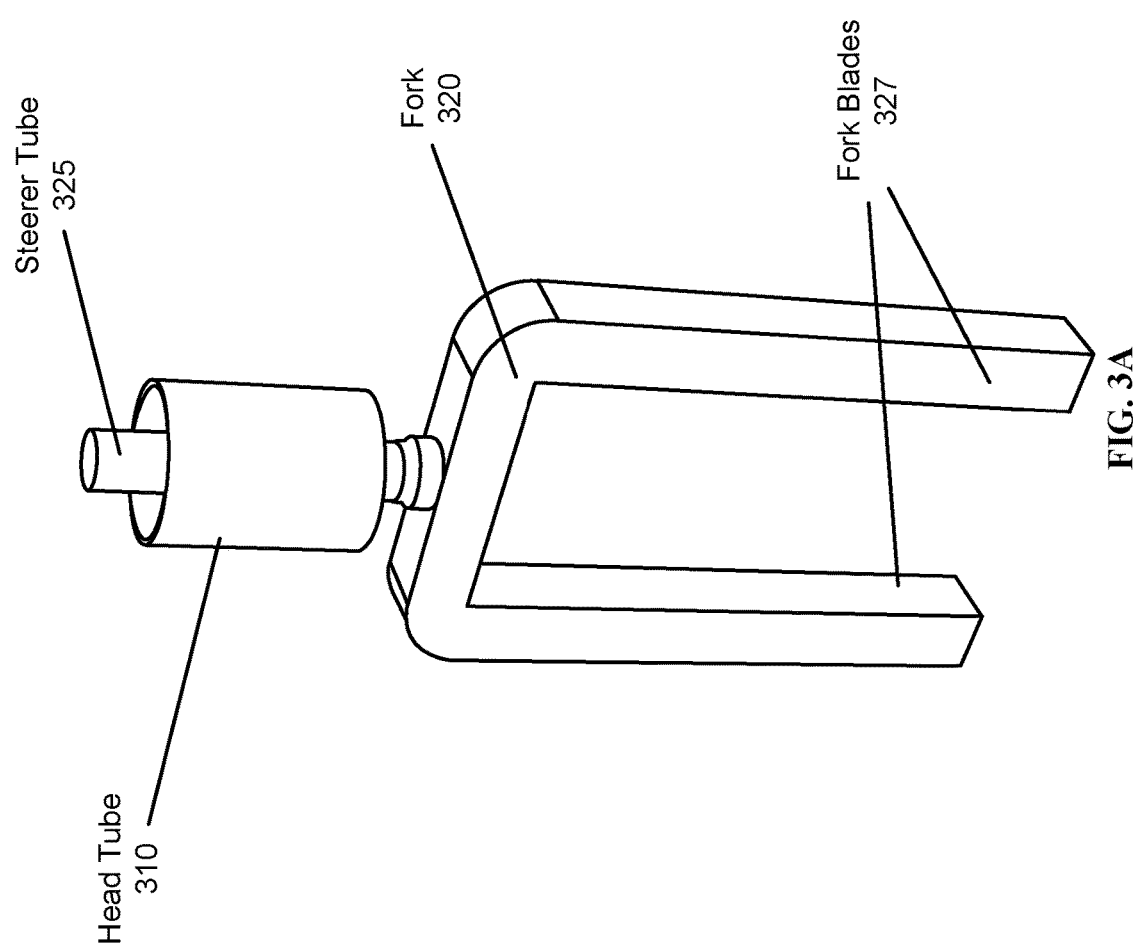
FIG. 3A illustrates an example steering assembly of an autonomous electronic bicycle, according to an embodiment.

FIG. 3A illustrates an example steering assembly of an autonomous electronic bicycle, according to an embodiment. The view 300 of FIG. 3A shows a head tube 310 of an example frame 105 and a fork 320 with a steerer tube 325 and fork blades 327 of an example steering assembly 120 attached to the frame 105 via the head tube 310.

As described above, the frame 105 of an AEB can be connected to a steering assembly 120 to allow enabling the front wheel 130 of the AEB to be steered relative to the frame 105. In the embodiment of FIG. 3A, the head tube 310 is the part of the frame 105 through which the steering assembly 120 is connected.

The fork 320 of FIG. 3A is a structural part of the steering assembly 120 providing a subframe for other components of the steering assembly 120 to attach to, according to some embodiments. The fork 320 of FIG. 3A includes a steerer tube 325 which is inserted within the head tube 310 to form a rotatable joint allowing the fork 320 to rotate relative to the frame 105 around the axis of the steerer tube 325. In addition, a set of handlebars (not shown) can be mounted to the portion of the steerer tube 325 extending above the head tube 310. The steerer tube 325 is shown as a solid tube but may be hollow and/or open and one or both ends, according to some embodiments. The front wheel 130 can be mounted between the fork blades 327 via an axle or other connection point. In some implementations, the fork blades 327 include suspension to absorb bumps in the road, potholes, or other imperfections in the road surface.

Figure 3B:
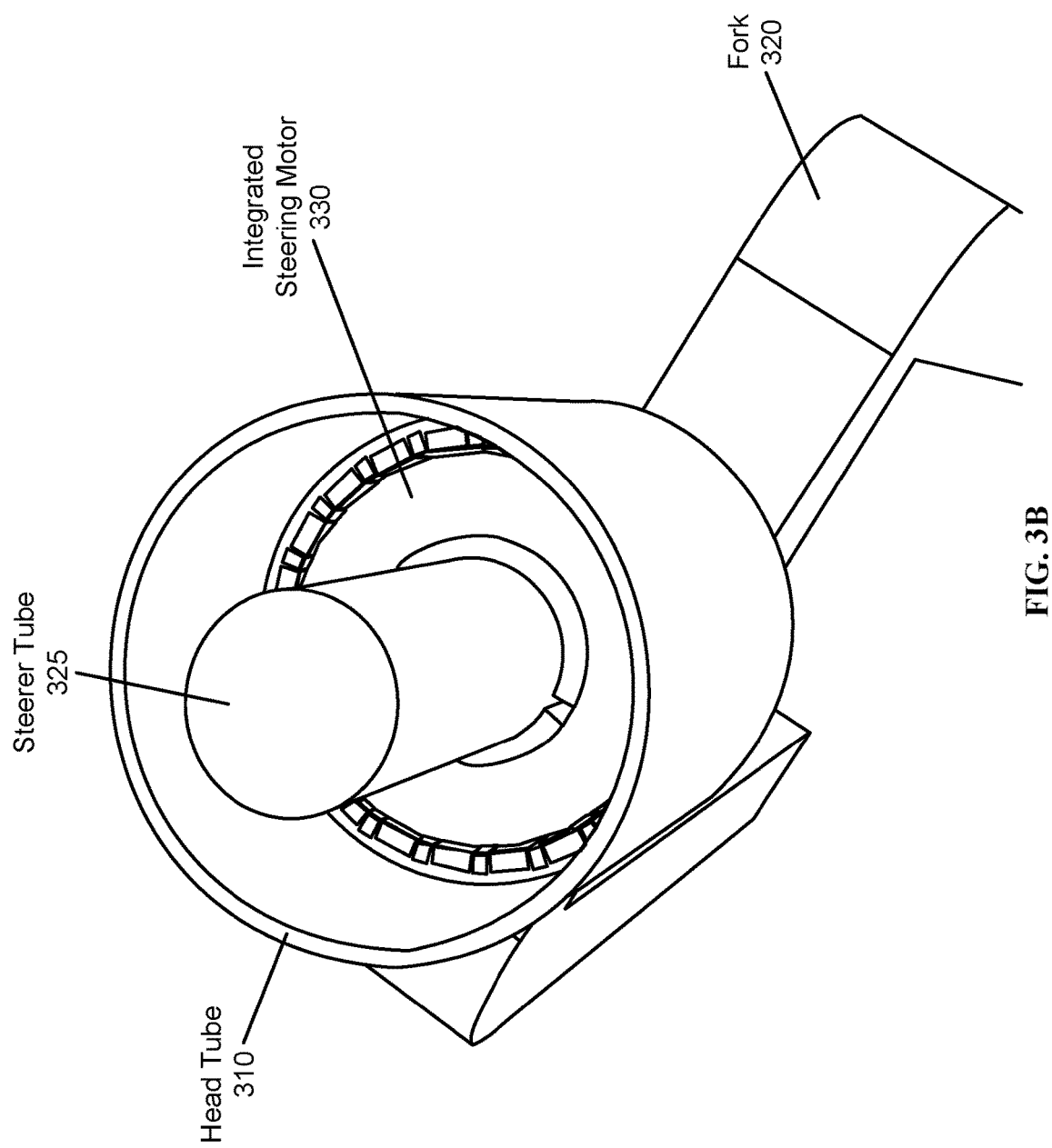
FIG. 3B illustrates an example steering assembly with an integrated steering motor, according to an embodiment.

As described above, the steering assembly 120 can be electronically actuated using a steering motor 125 which can articulate the steering assembly 120 (and therefore the front wheel 130) through a range of steering angles. The steering motor 125 is not visible in the view 300 of FIG. 3A. As described above, the steering motor 125 can be integrated within the head tube 310. FIG. 3B illustrates an example steering assembly with an integrated steering motor, according to an embodiment. The view 302 of FIG. 3B shows an integrated steering motor 330 mounted within the head tube 310 and directly turning the steerer tube 325 of the fork 320. In some implementations, the head tube 310 includes a headset or other set of bearings (not shown) to provide a low friction interface between the head tube 310 and the steerer tube 325.

The integrated steering motor 330 is a steering motor 125 configured as a direct drive motor, with the steerer tube 325 used as the shaft of the steering motor 330. The integrated steering motor 330 is integrated within the head tube 310 and can actuate the steering of the AEB 100 by turning the steerer tube 325. For example, the body of the integrated steering motor 330 can be mounted within the head tube 310 and the axle of the integrated steering motor 330 can be the steerer tube 325. In some implementations, the integrated steering motor 330 is constructed such that components of the rotor and/or stator of the integrated steering motor 330 (such as magnets or electromagnetic coils) are mounted to the interior surface of the head tube 310 or to the steerer tube 325. To accommodate the integrated steering motor 330 between the head tube 310 and steerer tube 325, the head tube 310 can be relatively oversized compared to the steerer tube 325. For example, the head tube 310 can have an interior diameter of approximately 76 mm (3 inches) and the steerer tube can have an exterior diameter of approximately 28.5 millimeters (1.12 inches).

Figure 3C:
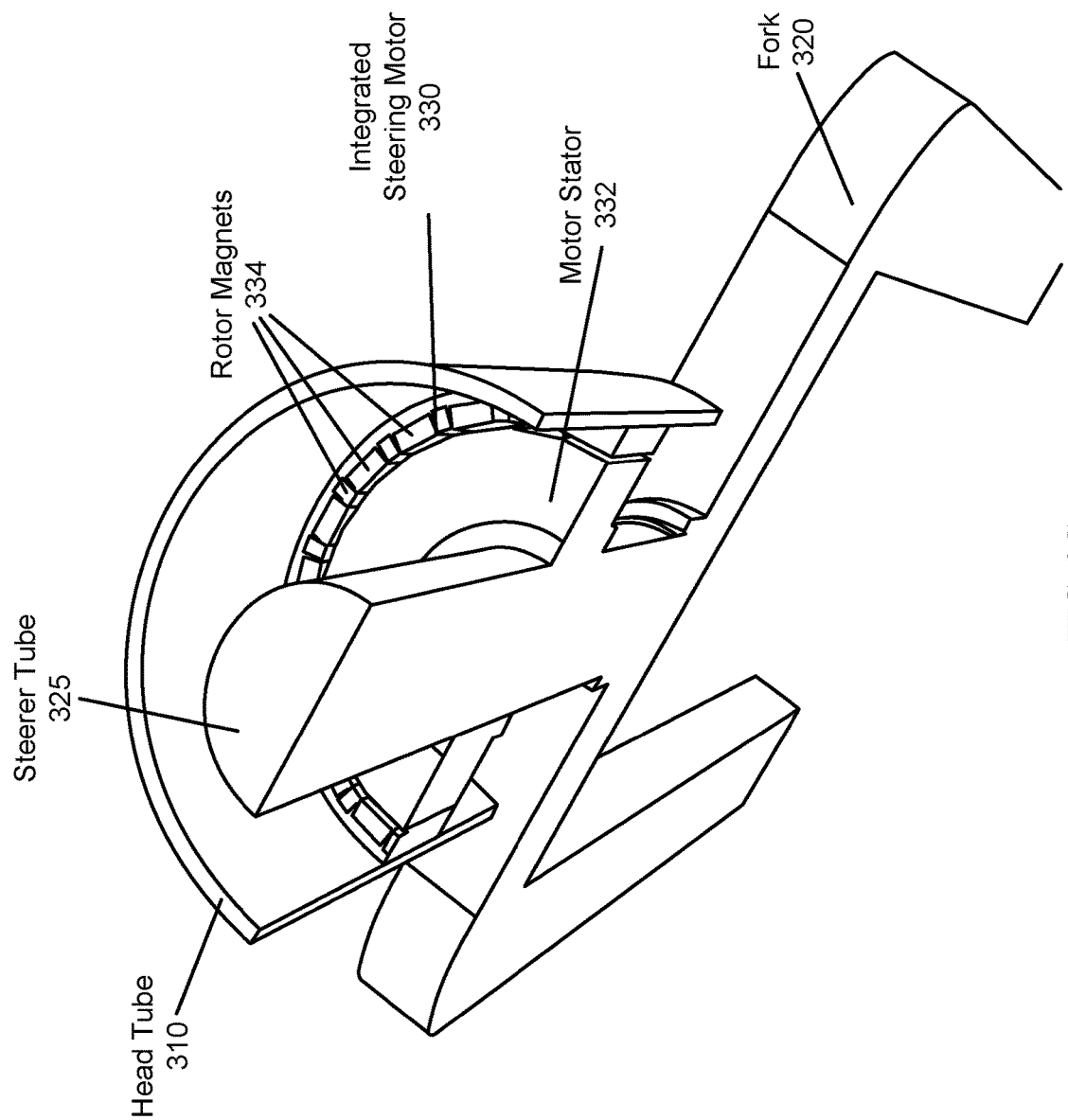
FIG. 3C is a cutaway view of an example steering assembly with an integrated steering motor, according to an embodiment.

FIG. 3C is a cutaway view of an example steering assembly with an integrated steering motor, according to an embodiment. The view 304 of FIG. 3C is a cutaway view showing components of the integrated steering motor 330, the motor stator 332 and rotor magnets 334, mounted within the head tube 310 or to the steerer tube 325 of the fork 320.

In the embodiment of FIG. 3, the motor stator 332 is mounted to the shaft of the motor (the steerer tube 325) and the rotor magnets 334 are mounted to the head tube 310. In other embodiments, this configuration can be reversed (for example, with the stator mounted to the head tube 310 and the rotor mounted to the steerer tube 325). The motor stator 332 can comprise a set of windings or coils which can be energized to create an electromagnet. The rotor magnets 334 can be a set of permanent magnets positioned to interact with the motor stator 332. In some implementations, the motor stator 332 and rotor magnets 334 are positioned to leave a small air gap between the motor stator 332 and rotor magnets 334. Therefore, in some implementations, physical contact at the joint between the head tube 310 and steerer tube 325 occurs at the headset (or other set of bearings), but not between the rotor magnets 334 and motor stator 332 of the integrated steering motor 330. Therefore, mechanical friction and wear between components of the integrated steering motor (and more generally, the joint between the steering assembly 120 and the frame 105) can be reduced by using the integrated steering motor 330. As described above, the durability advantages of direct drive motors are espe-cially relevant in applications where the AEB 100 will be deployed commercially or otherwise open for public use.

In some implementations, the stator of an electric motor is the component that is powered (which turns the unpowered rotor of the electric motor). In the configuration of FIG. 3C, the rotor of the integrated steering motor 330 is attached to the head tube 310 and the stator is attached to the fork 320, therefore the electric power for the integrated steering motor 330 is transmitted to the fork 320 (to power the motor stator 332). Routing power to the fork 320 rather than the head tube 310 may be more complex (as the battery 150 is located on the frame 105), however the front hub motor 135 (on the fork 320) also requires the fork 320 to be powered.

In some embodiments, a ring encoder is mounted within the head tube 310 to measure the rotation of the steerer tube 325 relative to the head tube 310. The ring encoder can be used to monitor the current steering angle of the AEB 100 based on which the integrated steering motor 330 can be controlled. In some implementations, the ring encoder can measure steering angle to within 0.005°.

Balance Modes for Autonomous Operation

As described above, the balance system 230 can control components of the autonomous electronic bicycle 100 (such as hub and steering motors or other autonomous bicycle hardware 250) to move the autonomous electronic bicycle 100 towards a target pose and maintain balance while the AEB 100 is in autonomous mode. For example, the balance system 230 can control the output torque of one or more of the hub motors 115 and 135 and the steering motor 125 to balance the autonomous electronic bicycle 100 while additionally powering the rear hub motor 115 to move the autonomous electronic bicycle 100 forward.

In some implementations, the balance system 230 selects one of several "balance modes" depending on the current pose and target pose of the AEB 100. Each balance mode can be adapted to different situation and may rely on different techniques or components of the AEB 100 to maintain balance. For example, the balance system 230 can select between a "suspend mode" relying on passive balance techniques (such as a deployed kickstand 170 or a docking station), an "autonomous motion mode" for actively balancing the autonomous electronic bicycle 100 while moving, and an "autonomous pause mode" for actively balancing the autonomous electronic bicycle 100 while temporarily stopped. Each balance mode can be effective within a certain range of poses of the AEB 100 (which may not overlap with other balance modes). For example, the autonomous motion mode may require a minimum forward speed to effectively balance the AEB 100 and the autonomous pause mode can rely on a track stand technique which cannot be effectively performed when traveling forward. In some implementations, changing between balance modes can require the use of an additional "transition mode" to place the autonomous electronic bicycle 100 in a correct pose for the new balance mode.

Figure 4:
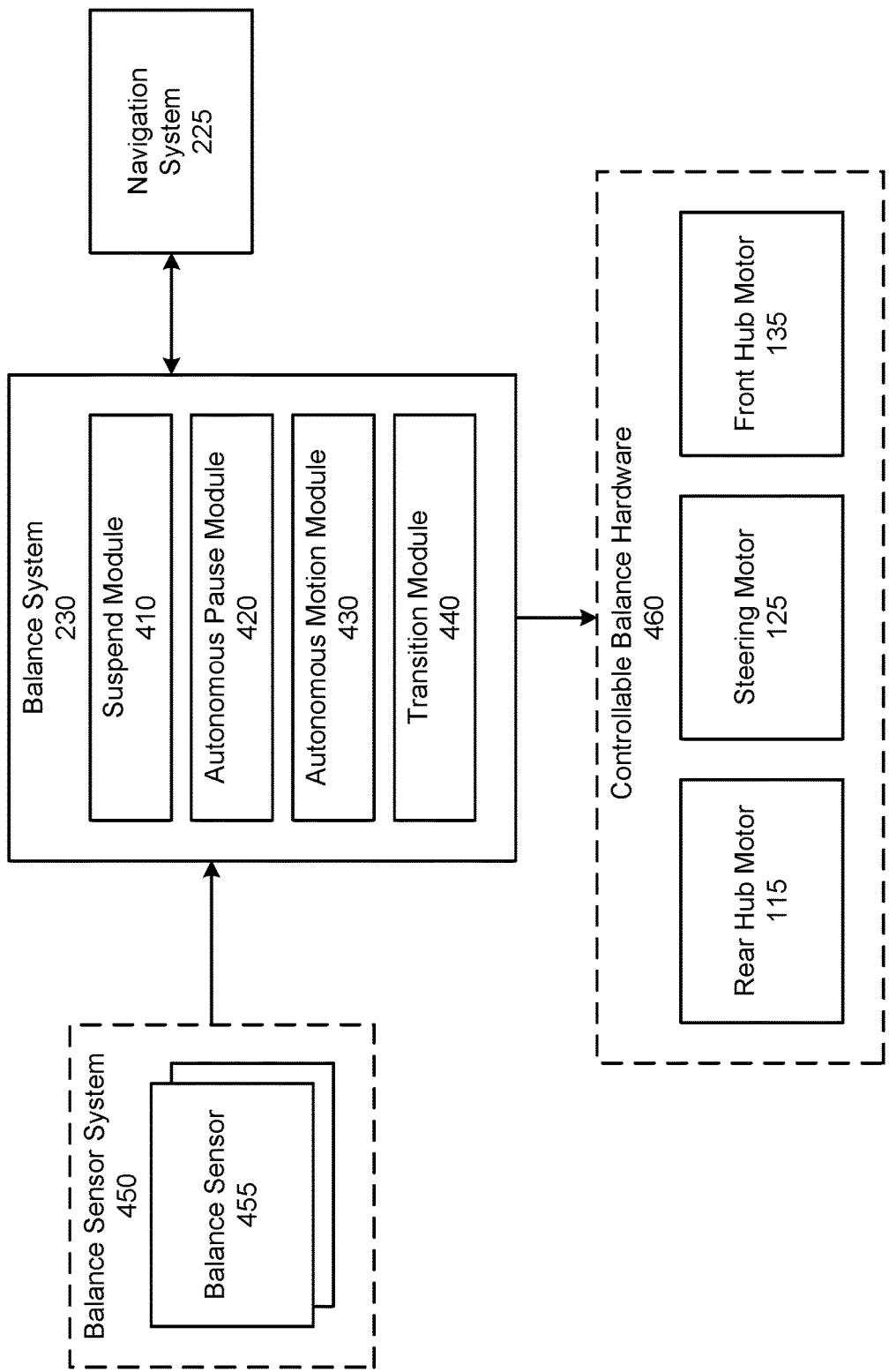
FIG. 4 is a block diagram of a balance system for an autonomous electronic bicycle, according to an embodiment.

FIG. 4 illustrates balancing components of an example autonomous electronic bicycle, according to an embodiment. As described above, the balancing components of FIG. 4 can be used to achieve (or attempt to achieve) a target pose of an autonomous electronic bicycle 100. The environment 400 of FIG. 4 includes a balance system 230, a navigation system 225 a balance sensor system 450, and a set of controllable balance hardware 460. The balance sensor system 450 includes a set of balance sensors 455 used to measure the current state of the autonomous electronic bicycle 100 or information about the immediate surroundings of the autonomous electronic bicycle 100 that may affect the balance of the autonomous electronic bicycle 100 (such as current road inclination, wind velocity, or surface traction conditions). For example, the balance sensor system 450 can include sensors 245 of the sensor system 240. Similarly, the controllable balance hardware 460 comprises components of the autonomous bicycle hardware 250 which can affect the balance of the AEB 100. For example, the controllable balance hardware 460 can include the steering motor 125, rear hub motor 115, and front hub motor 135 as shown in FIG. 4. In some embodiment components of the controllable balance hardware 460 are used by the balance system 230 to affect the pose of the autonomous electronic bicycle 100.

The balance system 230 can take input of a target pose along with other state information about the autonomous electronic bicycle 100 and send commands to the controllable balance hardware 460 (for example, the rear hub motor 115, front hub motor 135, steering motor 125, or other controllable aspect of the autonomous electronic bicycle 100) to attempt to achieve the target pose while maintaining the autonomous electronic bicycle in a balanced state. The AEB 100 can use a trained machine learning model or neural network, classical control theory techniques (such as feedback control, linear-quadratic regulator control, or predictive control), or a combination of the above to determine control commands to maintain the balance of the AEB 100. The neural network, machine learning system, or other algorithm can be determined or trained using any suitable method and using training data derived from, simulations, real-world testing, and any other suitable source.

As described above, the balance system 230 can operate in one of a set of balance modes based on the target pose and current pose of the autonomous electronic bicycle 100. In some embodiments, the balance system 230 is operating in a current balance mode (corresponding to the current pose) and can determine a desired balance mode based on the target pose. The balance system 230 can determine the desired balance mode based on the target velocity of the autonomous electronic bicycle 100 in the target pose (along with other factors). In some implementations, the navigation system 225 can include specific instructions for a desired balance mode in (or with) the target pose. In some implementations, the navigation system 225 only provides pose instructions in target poses for certain balance modes (for example, the navigation system may include that a target pose is for suspend mode, but not for other balance modes).

If the current and desired balance modes differ, the balance system 230 can initiate a transition (for example, using a transition balance mode) to switch balance modes. In some embodiments, the balance system 230 includes a set of modules, each controlling the balance of the autonomous electronic bicycle 100 in a corresponding balance mode. For example, the balance system 230 of FIG. 4 includes a suspend module 410 for a suspend mode, an autonomous motion module 420 for an autonomous motion mode, an autonomous pause module 430 for an autonomous pause mode, and a transition module 440 for a transition mode. Other implementations of a balance system 230 can include more, fewer, or different balance modes and corresponding modules depending on the capabilities and desired behavior of the autonomous electronic bicycle 100.

The suspend module 410 of the balance system 230 can control the balance of the AEB 100 when in suspend mode. In some implementations, the suspend mode relies on passive balance techniques to place the AEB 100 into an inherently stable state (for example, using a deployed kickstand or a docking station). Therefore, input to the controllable balance hardware 460 (for example, the hub motors and steering motor 115, 125, and 135) is not required to maintain balance under normal suspend mode conditions. Suspend mode can be used when the AEB 100 is to remain stationary for an extended period of time (for example, greater than a threshold amount of time). In some implementations, suspend mode may only be attainable under certain conditions (such as enough space and a level surface to deploy the kickstand, likelihood of encountering traffic or pedestrians, and/or the existence of a docking station) and can be more difficult to transition into and out of. For example, additional time may be required to deploy or retract the actuated kickstand 170 to enter or exit suspend mode. Therefore, the navigation system 225 can specify when to enter suspend mode, according to some embodiments.

The autonomous motion module 420 of the balance system 230 can control the balance of the AEB 100 when in autonomous motion mode. In some implementations, an AEB 100 in autonomous motion mode is being actively balanced while moving. The autonomous motion module 420 can use machine learning and/or classical control theory techniques to maintain the balance of the AEB 100 while in autonomous motion mode. In some implementations, the autonomous motion module 420 can maintain a relatively constant speed using the front and/or rear hub motors 115 and 135 while relying on frequent adjustments of the steering (using the steering motor 125) to balance the AEB 100. For example, the autonomous motion module 420 can set a target velocity based on the target pose and maintain that velocity while correcting any lateral lean by adjusting the torque of the steering motor 125 to turn the steering assembly 120 and correct for the unwanted lean. The autonomous motion mode can be selected by the balance system 230 when the AEB 100 is (or needs to be) autonomously moving.

The autonomous pause module 430 of the balance system 230 can control the balance of the AEB 100 when in autonomous pause mode. In some implementations, an AEB 100 in autonomous pause mode is effectively stopped, but still being actively balanced by the balance system 230. For example, the autonomous pause module 430 can place the AEB 100 in a track stand to remain relatively stationary and upright with minimal forward/reverse motion. To perform a track stand, the autonomous pause module 430 can select a fixed (or relatively fixed) steering angle and correct lateral lean of the AEB 100 using the hub motors 115 and 135. A greater steering angle (i.e. a steering angle closer to 90° to the left or right) can increase the stability of the AEB 100 when in autonomous pause mode, as control inputs to the hub motors 115 and 135 will result in a larger lateral force on the AEB 100 to counteract a lateral lean. The autonomous pause mode can be selected by the balance system 230 or navigation system 225 when the AEB 100 is temporarily stopped and may need to resume autonomous motion mode at short notice (such as at a stop sign, traffic light, or when waiting for an obstacle to clear). A track stand can be performed without the use of a kickstand (such as the actuated kickstand 170) and, in some implementations, the autonomous pause mode does not use any kickstand for balance purposes.

The transition module 440 of the balance system 230 can control the balance of the AEB 100 when transitioning between balance modes (i.e. when the AEB 100 is in transition mode). As described above, each of the balance modes can expect a different state of the AEB 100 in order to effectively balance. For example, the suspend mode expects the AEB 100 to be passively balanced without control input needed to maintain the balance, the autonomous motion mode can require a minimum forward/backward velocity to maintain the stability of the AEB 100 while balancing using steering inputs, and the autonomous pause mode can expect a stationary AEB with a steering angle within an expected range (for example, between 10° and) 90° to perform a track stand. Therefore, the balance system 230 can use a transition mode to bridge the gaps between the expected parameters of other balance modes.

In some implementations, the transition mode uses predetermined transition sequences designed to transition the AEB 100 between two of the other balance modes. In some implementations, each transition sequence includes command sequences of control commands for the controllable balance hardware 4-60 (such as the hub and steering motors 115, 125, and 135) designed to perform the transition between balance modes in certain conditions (such as current and target balance mode and current AEB 100 pose). Additionally, a transition sequence can include a series of expected poses of the AEB 100 throughout the transition sequence. For example, poses can be recorded at regular intervals, as each control command is issued, or at any other significant point during the transition. Transition sequences can be determined using a simulation of the AEB 100 to generate and/or test stable transitions between balance modes under a variety of conditions. After a transition sequence is simulated, the simulated poses of the AEB 100 and the simulated control commands used to make the transition can be used to generate the final transition sequence.

When entering transition mode, the AEB 100 can select an appropriate transition sequence out of the set of transition sequences based on the current and target pose and balance mode of the AEB 100. In some implementations, each combination of start and end balance modes can have a set of transition sequences associated with different starting and ending poses. For example, the set of transition sequences between autonomous motion mode and autonomous pause mode can include transition sequences simulated under varying road inclinations (flat, incline, decline, crosswise slope), and with different ending poses (track stand to the left or track strand to the right). Once an appropriate transition sequence is selected, the AEB 100 executes the selected transition sequence by transmitting the predetermined control commands of the transition sequence to the controllable balance hardware 460 at timings according to the transition sequence. After the transition sequence is finished, the balance system 230 can switch to the target balance mode and continue operation.

In some implementations, the transition mode incorporates feedback control to account for any deviations from the expected results of the transition sequence. For example, the conditions of the AEB 100 may be slightly different than the conditions under which the transition sequence was tested under or the AEB 100 may be bumped or otherwise disturbed when performing the transition sequence, leading to differences between the actual pose of the AEB 100 and the simulated pose which the transition sequence was based on. Implementations using feedback control can alter the commands to the controllable balance hardware 460 to keep the pose of the AEB 100 within an acceptable range of the expected pose at that point of the transition sequence. In some implementations, each transition sequence includes a threshold deviation (either a percentage or absolute deviation) for elements of the pose of the AEB (such as lateral lean, forward speed, steering position, and the like). When the threshold deviations are exceeded in the measured pose when compared to the expected pose from the transition sequence, the balance system 230 can use feedback control to bring the transition sequence back within the threshold deviation.

The balance sensor system 450 can comprise one or more balance sensors 455 that can determine a current position, orientation, pose, or other determination of the state of the autonomous electronic bicycle 100. For example, one or more balance sensors 455 can determine a current speed, current motor output to one or more motors of the autonomous electronic bicycle 100 (such as the steering motor 125, rear hub motor 115, and/or front hub motor 135), the current incline and terrain conditions of the autonomous electronic bicycle 100, or any other suitable information.

As described above, the controllable balance hardware 460 refers to a set of components of the autonomous bicycle hardware 250 which can affect the balance of the AEB 100 when operated. For example, the controllable balance hardware 460 can include the steering motor 125, rear hub motor 115, and front hub motor 135 as shown in FIG. 4.

Figure 5:
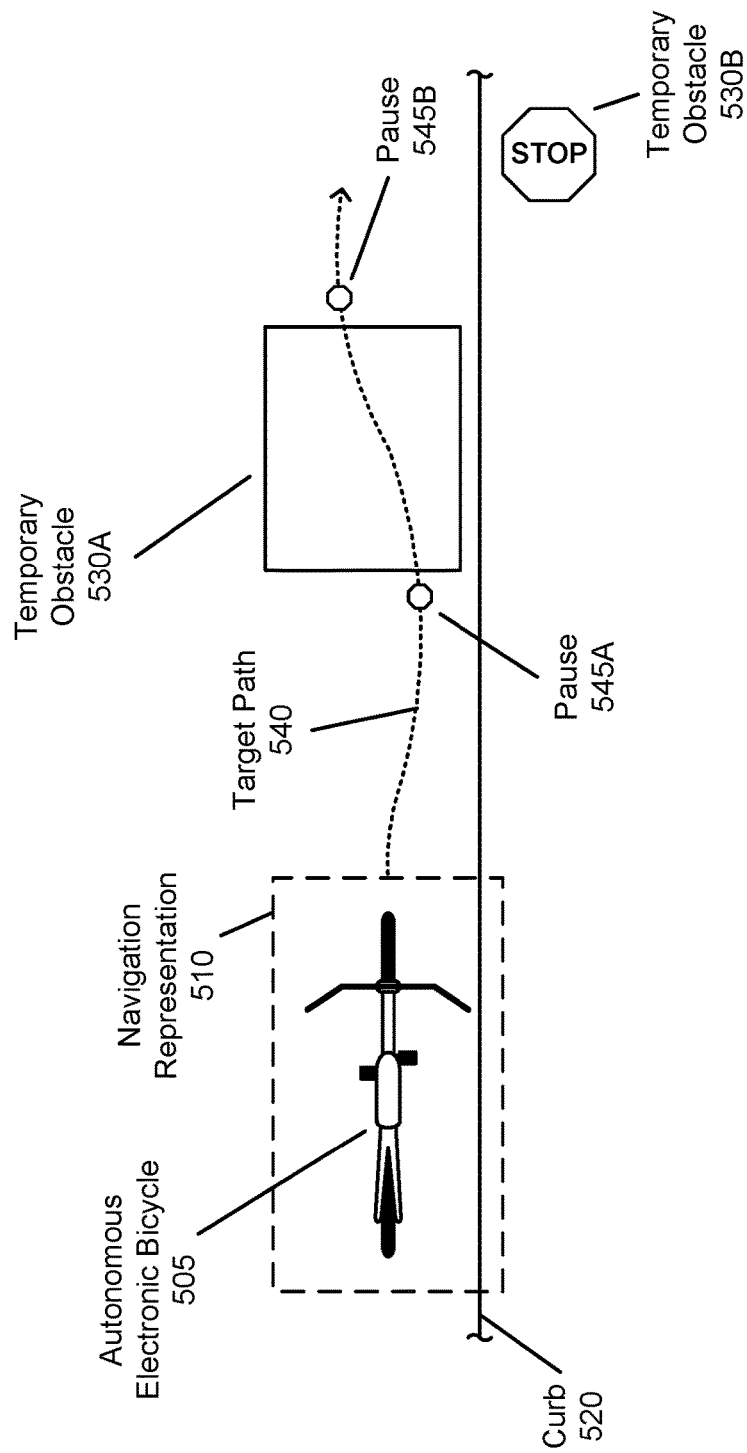
FIG. 5 illustrates a target path of an autonomous electronic bicycle including an autonomous pause, according to an embodiment.

FIG. 5 illustrates a target path of an autonomous electronic bicycle including an autonomous pause, according to an embodiment. The environment 500 of FIG. 5 includes an AEB 100 505 traveling through the environment 500, a navigation representation 510 of the AEB 100 505, a target path 540 for the AEB 100 505, and several obstacles such as a curb 520 and temporary obstacles 530. The generated target patch 540 can include pauses 545 where the AEB 100 505 will wait in place.

In some implementations, the navigation system 225 of the AEB 100 505 can generate the target path 540 for the AEB 100 505 based on the navigation representation 510 and known obstacles in the environment (such as the curb 520 and the temporary obstacles 530). The navigation system 225 can choose to navigate around certain obstacles (for example, the curb 520), but instruct the AEB 100 505 to pause 545 to avoid other obstacles, such as the temporary obstacles 540. In some implementations, the AEB 100 505 can execute a pause 545 by using the autonomous pause mode to perform a track stand, as described above. Autonomous pause mode and track stands will be discussed further in relation to FIG. 6.

For example, the temporary obstacle 530A can represent traffic such as a rider operated bicycle, another AEB 100, or a pedestrian standing in the street or bike lane. Rather than instructing the AEB 100 505 to go around the temporary obstacle 530A (which, in the situation of FIG. 5, may take the AEB 100 505 into the path of vehicular traffic), the navigation module 225 can instruct the AEB 100 505 to wait in place until the temporary obstacle 530A has moved and the target path 540 is clear for the AEB 100 505 to proceed. Further, a temporary obstacle 530 does not have to be an object physically blocking the AEB 100 505. For example, a temporary obstacle 530 can be a signifier of an intersection or other traffic control for which the AEB 100 505 needs to wait, such as the stop sign represented by temporary obstacle 530B. In some implementations, a pause 545 can be triggered in other situations, such as when the AEB 505 does not have enough sensor information to determine if it is safe to proceed along the target path 540. Pauses 545 can be preplanned in the target path 540 (for example, for a known stop sign or before a known intersection) or can be independently triggered on the fly based on a detected obstacle 530 or other triggering condition.

Figure 6:
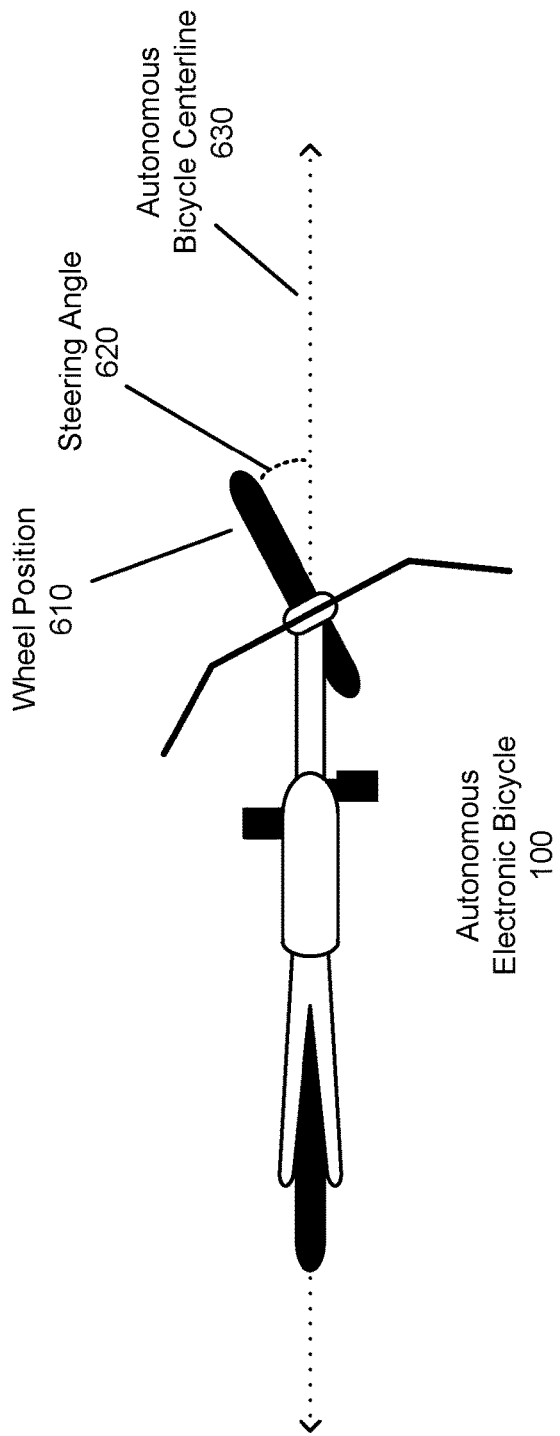
FIG. 6 illustrates an autonomous electronic bicycle performing a track stand while operating in autonomous pause mode, according to an embodiment

FIG. 6 illustrates an autonomous electronic bicycle performing a track stand while operating in autonomous pause mode, according to an embodiment. The environment 600 of FIG. 3 shows an AEB 100 with a wheel position 610 which forms a steering angle 620 relative to the autonomous bicycle centerline 630.

As described above, implementations of an autonomous pause mode can balance the AEB 100 by setting a constant steering angle 620 and providing forward and reverse torque to the front and/or rear hub motors 115 and 135 to balance the AEB 100. In these implementations, the chosen steering angle 620 can influence the effectiveness of the hub motors 115 and 135 in correcting lateral lean of the AEB 100. For example, if the steering angle 620 is 0° (i.e. the front wheel 130 is parallel to the autonomous bicycle centerline 630) any torque applied to the hub motors 115 and 135 would result in a force directly along the autonomous bicycle centerline 630 with no lateral component able to correct for lateral lean of the AEB 100. As the steering angle 620 increases towards 90° the component of the force generated by the hub motors 115 and 135 that is perpendicular with the autonomous bicycle centerline 630 also increases. However, there are tradeoffs to selecting too great of a steering angle, for example a track stand with a relatively greater steering angle 620 can be more stable than a track stand with less steering angle TT_20, but may be more difficult (or slower) to enter and can appear less controlled or predictable to other vehicles or pedestrians observing the AEB 100. In some implementations a steering angle 620 is chosen by the autonomous pause module 420 based on the current conditions. The steering angle 620 can be refined during the track stand, and may be slowly adjusted if, for example the AEB 100 is becoming unstable.

Similarly, the autonomous pause module 420 can select if the track stand is a left or right track stand (i.e. if the front wheel 130 is turned to the left or right when performing the track stand) based on the current conditions, known obstacles, and/or an expected direction of motion on exiting the track stand, according to some embodiments. Applying torque to the front hub motor 135 can be relatively more effective than applying torque to the rear hub motor 115 at correcting for lateral lean of the AEB 100 when in a track stand, although implementations can use either or both of the front and rear hub motors 115 and 135 depending on the capabilities of the AEB 100 (for example, if the AEB 100 does not have a front hub motor 135) and other factors.

As described above, after the steering angle 620 is chosen for the track stand, the hub motors 115 and 135 can be used to actively balance the AEB 100. Driving one or more of the hub motors 115 and 135 forward can correct for a lean in the direction the front wheel 130 is turned and driving hub motors 115 and 135 backward corrects for a lean in the opposite direction, according to some embodiments. Theoretically, there is a point at which the AEB 100 will be perfectly balanced when in a track stand (requiring no active input from the hub motors 115 and 135 to stay upright), but this state may be difficult to practically achieve (due to changing conditions and imprecision in control over the hub motors 115 and 135. Therefore, implementations of an AEB 100 can experience some degree of "torque rippling," where the AEB will quickly oscillate back and forth around the ideal balance point.

In some embodiments, the degree (and therefore the noticeability) of torque rippling of an AEB 100 is correlated with how precisely the AEB 100 can determine and control the wheel positions of the front and/or rear wheels 110 and 130. For example, an AEB 100 that can measure and control current wheel position to within approximately 2° can make a minimum measurable correction to wheel position in an increment of 2°. Therefore, while maintaining a track stand, the autonomous pause module 420 can oscillate between wheel positions roughly 2° apart trying to find the ideal balance point, resulting in visible torque rippling. The severity of the torque rippling can be reduced improving the autonomous electronic bicycle's control over the front and/or rear wheels 110 and 130. For example, a direct drive hub motor design (as described above) can be used to eliminate mechanical lash or other play inherent in many power transfer methods (such as a chain, gear, or belt drive). Similarly, high precision sensors can be used to closely measure the position of the wheels 110 and 130 and hub motors 115 and 135, such as ring encoders built into the hub motors 115 and 135. A combination of these techniques can lead to theoretical control to within 0.005°. In some implementations, control over the wheels 110 and 130 to within 0.5° minimizes torque rippling to the point where an average observer would not notice any oscillation of the AEB 100.

Figure 7:
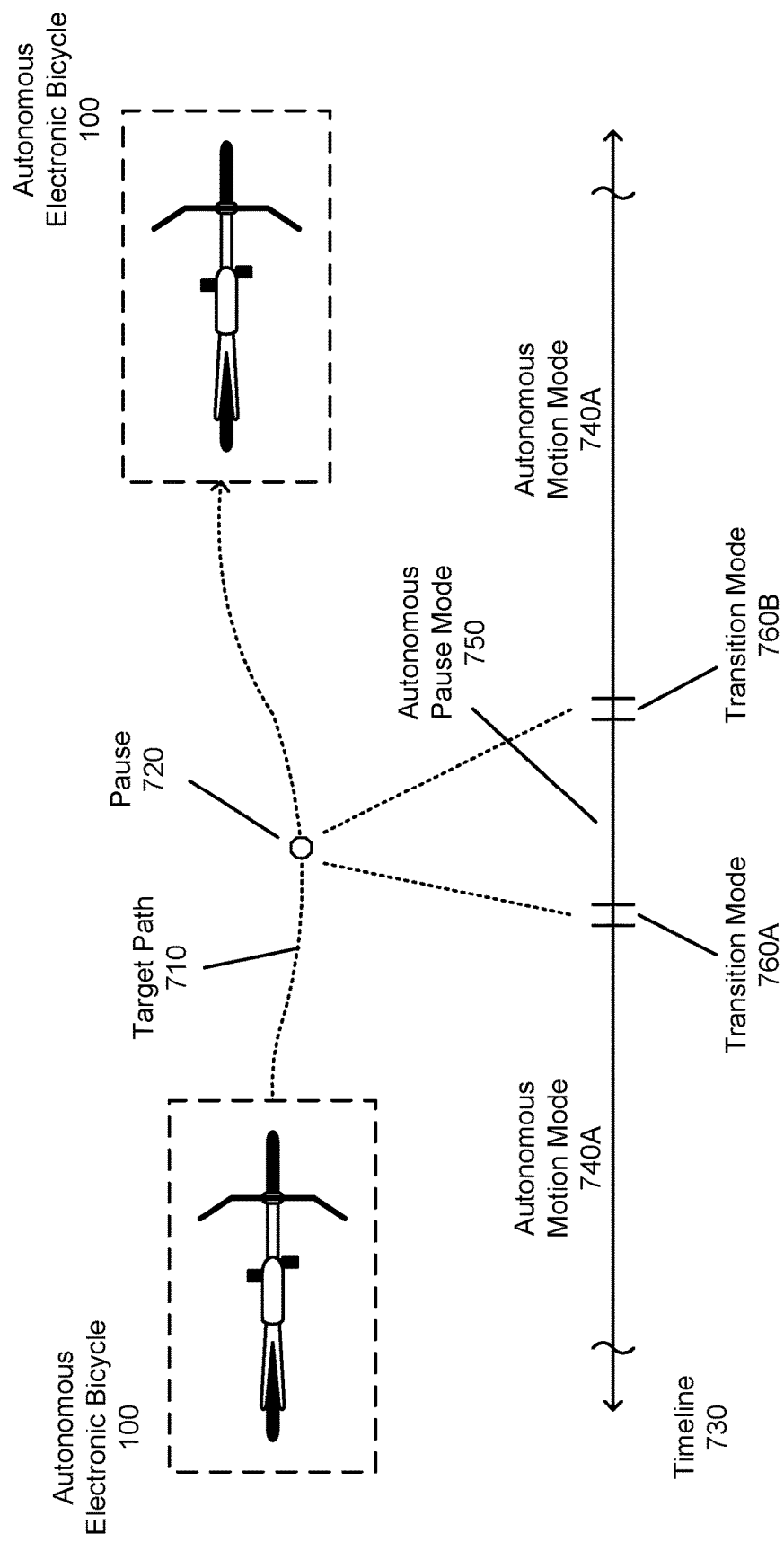
FIG. 7 illustrates transition periods between an autonomous pause mode and an autonomous motion mode, according to an embodiment.

FIG. 7 illustrates transition periods between an autonomous pause mode and an autonomous motion mode, according to an embodiment. Here, the environment 700 includes an AEB 100 traveling on a target path 710 with a pause 720. A timeline 730 of the AEB 100 as it moves along the target path 710 includes periods in autonomous motion mode 740, transition mode 760, and autonomous pause mode 750.

The timeline 730 starts as the AEB 100 navigates along the target path 710 in autonomous motion mode 740A. When the balance system 230 determines the AEB 100 should enter autonomous pause mode, the timelines 730 shows the AEB 100 entering transition mode 760A to move from autonomous motion mode to autonomous pause mode. As described above, the transition module 440 can select a transition sequence (here, a transition sequence to transition from autonomous motion mode to autonomous pause mode) and execute the transition sequence over the transition mode period 760A. After the transition mode period 760A, the AEB 100 is placed in autonomous pause mode for the period 750 as the AEB 100 is paused 720. When the AEB 100 is again to resume motion, another transition sequence, this time to transition from autonomous pause mode to autonomous motion mode, is selected and executed in the second transition mode period 760B. After the transition sequence is executed, the AEB 100 can resume travel in autonomous motion mode period 740A.

Figure 8:
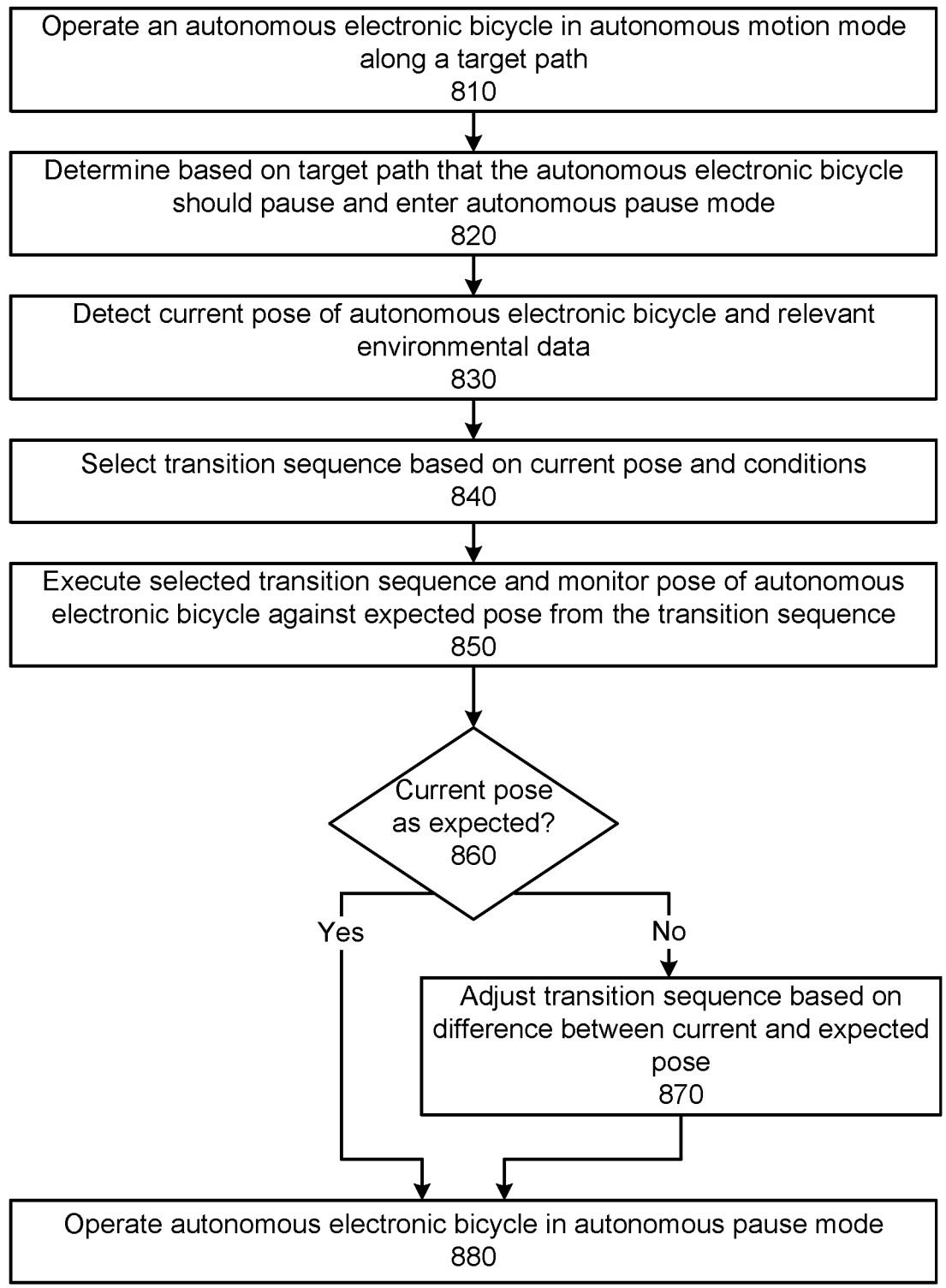
FIG. 8 is a flowchart illustrating a process for transitioning to an autonomous pause mode from an autonomous motion mode, according to an embodiment.

FIG. 8 is a flowchart illustrating a process for transitioning to an autonomous pause mode from an autonomous motion mode, according to an embodiment. The process 800 begins as a bicycle control system operates 810 an autonomous electronic bicycle along a target path in autonomous motion mode. Then, the bicycle control system determines 820 that the autonomous electronic bicycle should pause and enter autonomous pause mode based on the target path. As described above, this determination can be made based on a pause instruction inserted into the target path (for example, for the autonomous electronic bicycle to stop for a stop sign) or based on the target path intersecting with a temporary obstacle. The bicycle control system then detects 830 a current pose of the autonomous electronic bicycle and environmental conditions and nearby objects relevant to transitioning to autonomous pause mode. For example, the gathered data can include a current pose of the autonomous electronic bicycle, a current road inclination, and an available space in which to perform the transition. In some implementations, the gathered data is sensor data continuously gathered by the autonomous electronic bicycle. Using the gathered pose and environment data, the balance system selects 840 a transition sequence to enter autonomous pause mode. The bicycle control system then executes 850 the selected transition sequence and monitor the pose of the autonomous electronic bicycle against an expected pose of the transition sequence at that point. If the current pose is as expected 860, the transition sequence continues as normal, but if a discrepancy greater than a threshold is detected, the rest of the transition sequence is adjusted 870 to correct the difference between the current and expected pose. After the transition sequence completes, the bicycle control system operates 880 the autonomous electronic bicycle in autonomous pause mode.

Rider Characteristic Based Safety Constraints

As described above, an AEB 100 can operate in autonomous mode without a rider or direct rider control or in manual mode with direct input from a human rider of the AEB 100. In some implementations, the rider control module 220 controls the functions of the AEB 100 and can provide output to autonomous bicycle hardware 250 in response to received rider inputs. When in manual mode, the rider control module 220 of the AEB 100 can use a set of sensors to determine characteristics of the rider of the AEB 100. The determined "rider characteristics" can be used by the rider control module 220 when interpreting control inputs received from that rider (such as pedal/throttle inputs or steering inputs) to improve the rider's control over the AEB 100 or to keep from exceeding safe limits for that rider as determined by the rider characteristics.

Figure 9:
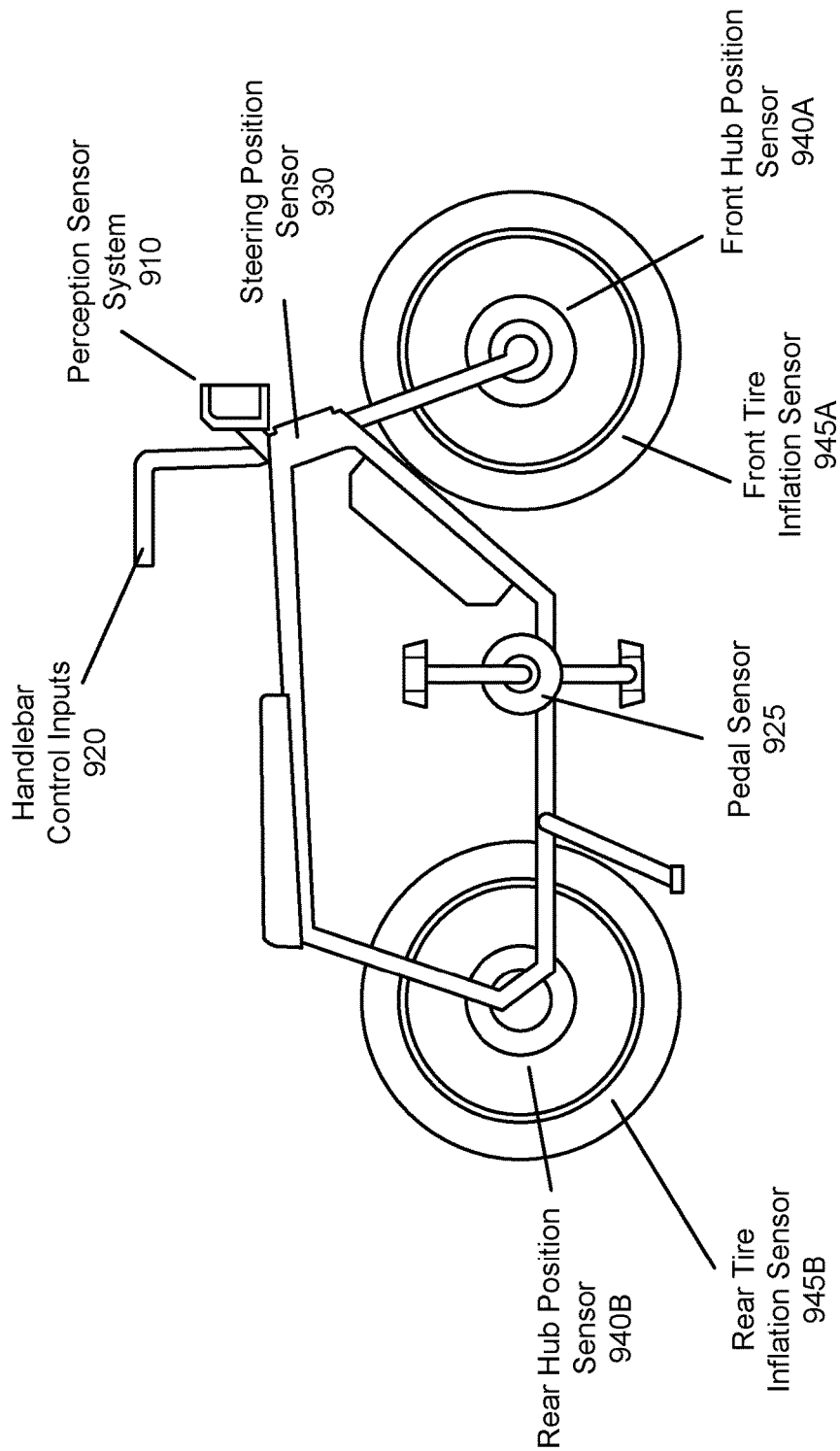
FIG. 9 illustrates example sensor components of an example autonomous electronic bicycle used to determine rider characteristics, according to an embodiment.

As described, an AEB 100 can include a sensor system 160 comprising sensors or suites of sensors to monitor both the current performance of the AEB 100 and perceive the surroundings of the AEB 100. The sensors of the sensor system 160 can be located at any suitable position on the autonomous electronic bicycle 100, either grouped together or distributed as appropriate to the specific sensor. The sensor system 160 can comprise GPS sensors, gyroscopes or other orientation sensors, accelerometers, IMUs (Inertial Measurement Units), magnetometers, motion detectors, pedal and motor position sensors, SLAM or VSLAM systems, depth sensors, curb feelers, and any other suitable sensors, each configured to produce a signal representative of a characteristic of the bicycle (such as a location of the bicycle, a position or orientation of the bicycle, a surrounding of the bicycle, and the like). FIG. 9 illustrates example sensor components of an example autonomous electronic bicycle used to determine rider characteristics, according to an embodiment. The environment 900 shows an example AEB 100 with sensors including a perception sensor system R1_10, handle bar control inputs 920, a pedal sensor 925 a steering position sensor 930, a front hub position sensor 940A and front tire inflation sensor 945A, and a rear hub position sensor 940B and rear tire inflation sensor 945B. An AEB 100 can comprise additional sensors of the sensor system 160 not specifically shown in FIG. 9, according to some embodiments.

The perception sensor system 910 can comprise a suite of sensors designed to determine the local environment surrounding the AEB 100 and the position of the AEB 100 within the local environment. For example, the perception sensor system 910 can include a GPS system capable of determining a coordinate position of the autonomous electronic bicycle 100, a SLAM system which can be used to determine a local environment map comprising information about the location, size, shape, and/or type of one or more obstacles in the local environment of the autonomous electronic bicycle 100. Similarly, the local environment map can contain terrain contour information about the local environment of the autonomous electronic bicycle 100 or a localized position of the autonomous electronic bicycle on an existing map of an operating area. The SLAM system can include one or more cameras (for example, RGB cameras and/or infrared cameras) and/or depth sensor systems (for example, RADAR, SONAR, LIDAR, or IR depth sensor systems).

The handlebar control inputs 920 can include various rider inputs mounted to the handlebars depending on the embodiment. For example, the handlebar control inputs 920 can include a throttle control (in some implementations) and front or rear braking controls. In some implementations, the rider turns the handlebars to control the steering of the AEB 100 in manual mode although steering input can be picked up by the separate steering position sensor 925. The steering position sensor 925 can measure the angle of the steering assembly 120 relative to the frame 105. As described above, the steering position sensor 925 can comprise a high precision ring encoder integrated into the head tube of the AEB 100 (for example, as part of a steering motor 125 integrated into the head tube).

The pedal sensor 930 can detect rider input to the pedal assembly 140, for example, detecting the speed (cadence) and/or force with which the user is pedaling. As described above, implementations of an AEB 100 may not have a mechanical connection between the pedal assembly 140 and the rear wheel 110. In these implementations, the pedal sensor 930 can determine how much power to send to the rear hub motor 115.

The hub position sensors 940 can detect the position of the front wheel 130 (by the front hub position sensor 940A) and the rear wheel 110 (by the rear hub position sensor 940B). The hub position sensors 940 can be used to determine a current speed of the AEB 100, to detect when one of the wheels 110 and 130 has lost traction, and, as described above when performing an autonomous track stand.

The tire inflation sensors 945 can determine the current tire pressure of the front wheel 130 (by the front tire inflation sensor 945A) and the rear wheel 110 (by the tire inflation sensor 945B). The tire inflation sensors 945 can detect needed maintenece (low tire pressure or a flat tire), as well as help to determine rider weight, according to some embodiments.

In some implementations, the sensors of the sensor system 160 can be divided into "performance sensors" which measure characteristics of the AEB 100 itself and "perception sensors" which gather information about the surroundings of the AEB 100. Performance sensors can include control input sensors, accelerometers, gyroscopes, the steering position sensor 930, hub position sensors 940, tire inflation sensors 945, and other sensors directly measuring current characteristics of the AEB 100. In contrast, perception sensors include cameras, depth sensors, and other sensors of the perception sensor system 910, according to some embodiments.

Figure 10:
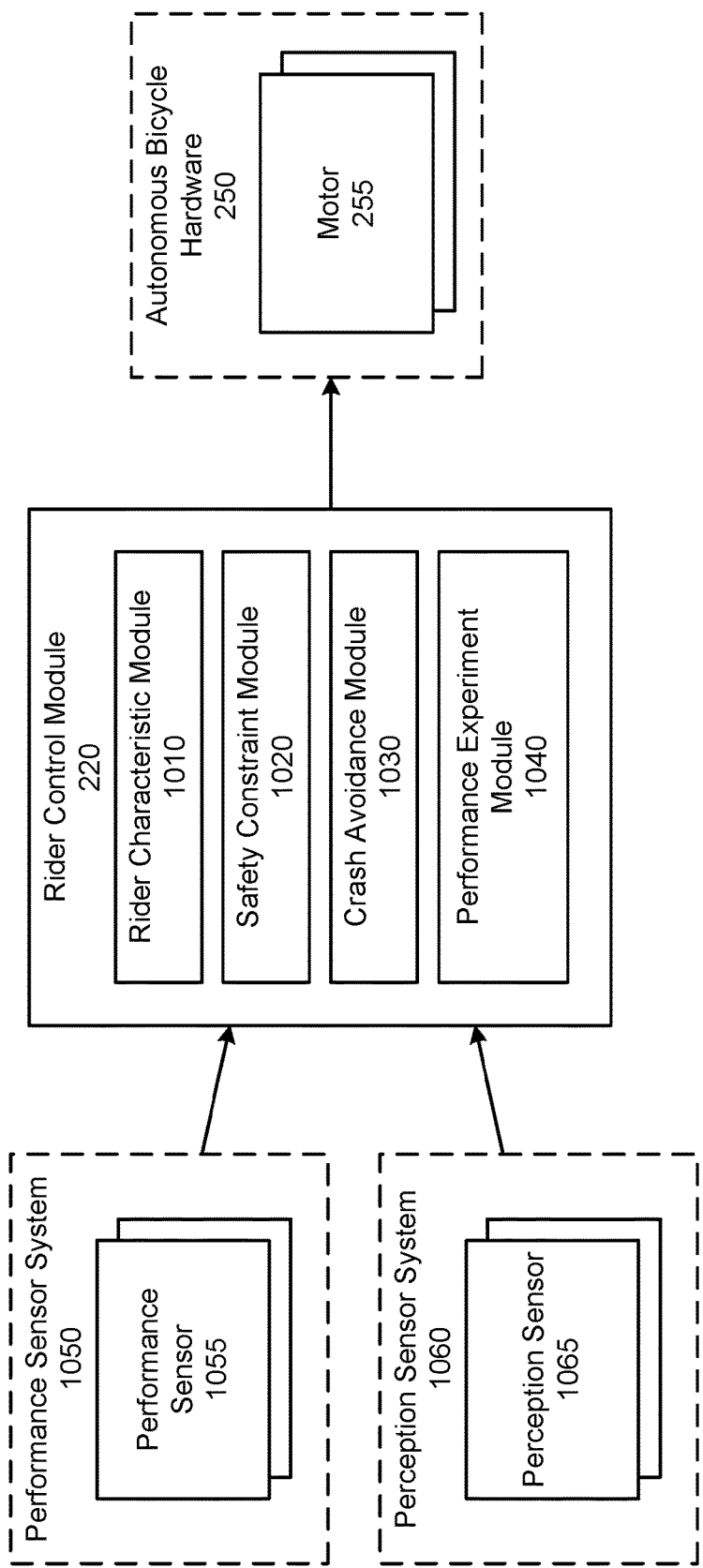
FIG. 10 is a block diagram of a rider control module for an autonomous electronic bicycle, according to an embodiment.

As described above, the rider control module 220 of the bicycle control system 210 can control a variety of functions of an autonomous electronic bicycle 100 in manual mode. For example, the rider control module 220 can control the steering motor 125 to damp rider steering inputs while maintaining the feel of a compliant actuator. Similarly, the rider control module 220 can power one or more of the front and rear hub motors 135 and 115 proportional to a suitable user input (such as an input to the pedal assembly 140). FIG. 10 is a block diagram of a rider control module for an autonomous electronic bicycle, according to an embodiment. The environment 1000 of FIG. 10 includes the rider control module 220, a performance sensor system 1050, a perception sensor system 1060, and autonomous bicycle hardware 250.

In some embodiments, the performance sensor system 1050 includes a set of perception sensors 1055 used to measure the current state of the autonomous electronic bicycle 100, as described above. Similarly, the perception sensor system 1060 can include a set of performance sensors 1065 used to gather information about the immediate surroundings of the autonomous electronic bicycle 100. For example, the performance sensor system 1050 can include performance sensors of the sensor system 240 and the perception sensor system 1060 can include perception sensors of the sensor system 240 (such as the performance sensor system 910). As described above, the autonomous bicycle hardware 250 can include electronically controllable systems of the autonomous electronic bicycle 100, such as the motor 255.

Using information from the performance sensor system 1050 and/or perception sensor system 1060, the rider control module 220 can determine rider characteristics of the rider of the AEB 100 and use the determined rider characteristics to improve the rider's control over the AEB 100 or to keep from exceeding safe limits for that rider as determined by the rider characteristics. The rider control module 220 of FIG. 10 includes a rider characteristic module 1010, a safety constraint module 1020, a crash avoidance module 1030, and a performance experiment module 1040. In alternative configurations, different and/or additional modules may be included in the rider control module 220.

The rider characteristic module 1010 can receive sensor input from the performance sensor system 1050 and perception sensor system 1060 and determine a set of rider characteristics of the rider based on the received sensor input. For example, the rider characteristics module 1010 can determine a rider weight (and a number of riders), if the rider is wearing a helmet, and a rider skill profile measuring an ability of the rider to effectively control the AEB 100 in their current state.

The rider characteristic module 1010 can, in some embodiments, determine a rider weight for a rider of the AEB 100 (or a total rider weight if there are multiple riders or if a rider loads the AEB 100 with cargo) based on the tire inflation sensors 945. In some implementations, the rider characteristic module 1010 determines rider weight based on the difference in tire pressure (as measured by the tire inflation sensors 945) before and after the rider mounts the AEB 100. Once the tire pressure difference is known, the rider characteristic module 1010 can extrapolate a rider weight based on the magnitude of the pressure increase, the measured tire pressure, and/or a known unloaded weight of the AEB 100.

The rider characteristic module 1010 can also estimate rider weight using a "sum of forces" method based on measured acceleration of the AEB 100 in response to a known force provided by the hub motors 115 and 135. Implementations of an AEB 100 can use a virtual pedal system where the pedal assembly 140 is not directly connected to the rear wheel 130, and therefore torque on the wheels 110 and 130 is provided by the hub motors 115 and 135. In such implementations, the rider characteristic module 1010 can determine a forward force applied to the AEB 100 by the hub motors 115 and 135 (for example, based on known characteristics of the hub motors and the percentage of maximum power they are being run at) and estimate rider weight based on the resulting acceleration of the AEB 100 as measured by the hub position sensors 940.

Implementations can use any combination of these methods to estimate rider weight. For example, the tire pressure estimation method may be less effective if the AEB 100 has a tire with unusually low pressure or there is an issue with a tire inflation sensor 945. Similarly, the sum of forces method may be unreliable when the measured wheel speed of the AEB 100 does not match actual forward speed (for example, on a slippery or loose surface). Therefore, the rider characteristic module 1010 can use an average or combination of the determined rider weights, or select one based on current conditions. Similarly, the determined rider weight can be used to estimate the number of riders of the AEB 100. In some implementations, rider weight is determined after the rider begins riding (as when stopped, a rider's full weight is unlikely to be on the AEB 100).

In some embodiments, the rider characteristic module 1010 can determine if the rider is currently wearing a helmet using the perception sensor system 1060. For example, the rider characteristic module 1010 can use a video feed of the rider (for example, from a camera normally used for environment mapping in autonomous mode) to determine if the rider is wearing a helmet using a trained machine learning model. Other implementations allow a rider to manually confirm if they are wearing a helmet (and otherwise default to no helmet).

According to some implementations, the rider characteristic module 1010 develops a rider skill profile of the rider as they ride the AEB 100. A rider skill profile can be determined by monitoring the control inputs of the user relative to situations encountered while riding the AEB 100. Using the gathered information, the rider characteristic module 1010 can determine rider skill as a score (for example, on a scale from skilled to unskilled) and/or place the rider into a category (such as categories of inexperienced rider, experienced rider, and impaired rider). The placement of a rider into an "inexperienced rider" category can indicate that the rider is capable of safely riding the AEB 100 under normal conditions and a placement into an "experienced rider" category can indicate a greater ability to handle unusual situations. The "impaired rider" category can indicate a determination that the rider cannot safely operate the AEB 100 under normal conditions (for example, due to inability to ride a bicycle, inebriation, or exhaustion).

To determine a rider skill profile, the rider characteristic module 1010 can use data collected about the rider's center of gravity, brake input, steering input, and pedal (and/or throttle) input to determine the rider skill profile using a trained machine learning model or other algorithm. In some implementations, the smoothness of user control inputs and center of gravity motion can be used to determine rider skill. For example, wild shifts of a rider's center of gravity, frequent application of maximum braking force, and use of excessive steering angle/torque can indicate an inexperienced rider. Similarly, a delay between a stimulus (such as the AEB 100 tipping to one side or an obstacle appearing) can indicate an impaired rider. For example, if the AEB 100 detects a lateral lean of greater than a threshold degree (and the AEB 100 is not performing a turn where some degree of lean is normal), the reaction time of the rider to correct the lean can indicate their skill level or current state.

The rider characteristic module 1010 can directly receive rider information from the rider through an interface of the AEB 100 or a client device 270 of the rider. For example, a rider may be able to select a desired effort level or ("virtual gear ratio") when pedaling controlling the ratio of rider power input to the pedal assembly 140 to the power output to the wheels 110 and 130. In some implementations, rider power output can vary from 0 (a full ebike mode) to 1:1.

Similarly, the rider characteristic module 1010 can collect a rider's age and may place additional restrictions on riders who are minors.

In some embodiments, the rider characteristic module 1010 additionally determines environmental conditions that may affect safety constraints placed on the AEB 100. For example, the rider characteristic module 1010 can determine current traction conditions based on a known low traction surface type (such as gravel), current weather conditions (such as if it is raining), or recently detecting wheelspin at one or both wheels. Similarly, the rider characteristic module 1010 can detect if one or both tires are flat based on the tire inflation sensors 945 or based on bike dynamics. In some implementations, the perception sensor system 1065 can be used to determine the current environment (if there is heavy traffic/crowds of pedestrians, and if the AEB 100 is being ridden in a bike lane or on a separated trail or bike path).

The safety constraint module 1020 can set limits on the operation of the AEB 100 in manual mode based on the rider characteristics (such as rider weight or skill level) and/or environmental characteristics determined by the rider characteristic module 1010. To enforce the selected safety constraints, the safety constraint module 1020 can modify control commands sent to autonomous bicycle hardware 250 to remain within or attempt to return to the desired limits. In some implementations, the safety constraint module 1020 can notify the rider of the selected safety constraints and if any safety constraints are currently being violated.

In some embodiments, the safety constraint module 1020 places a safety constraint on maximum incline based on rider weight and/or estimated traction. An AEB 100 has a maximum power that can be provided by the hub motors 115 and 135 (based on the strength of the hub motors 115 and 135 and the estimated traction of the wheels) to push a known weight (the determined rider weight and weight of the AEB 100) up an incline. Using the determined rider characteristics, the safety constraint module 1020 can determine a maximum incline the AEB 100 and rider can ascend. In some embodiments, the maximum incline is chosen based on a threshold maximum speed (for example, chosen such that the AEB 100 will not obstruct other traffic). To enforce this safety constraint, the AEB 100 can suggest navigation routes that bypass roads with inclines exceeding the maximum incline and warn the rider if the AEB 100 begins ascending at a rate exceeding the maximum incline.

The safety constraint module 1020 can set a maximum speed constraint for the AEB 100 based on a variety of determined rider characteristics. In some implementations, a base maximum speed constraint is determined based on the rider skill level (higher for skilled riders). In some implementations, the determined maximum speed is then modified based the current environmental congestion (for example, how many pedestrians are around if riding on a sidewalk) or other similar factors. The safety constraint module 1020 can set the maximum speed constraint to achieve a safe minimum stopping distance. Minimum stopping distance can be affected by rider weight (with a static braking strength), so the safety constraint module 1020 can also set maximum speed based to allow the rider enough time to react and stop in the case of an unexpected obstacle. In some implementations a safe maximum speed is calculated for both rider skill and minimum stopping distance and the lower speed is chosen as the maximum speed constraint. The safety constraint module 1020 can enforce the maximum speed constraint by preventing the rider from accelerating past the determined maximum speed, for example, by limiting the hub motors 115 and 130 from accelerating past the maximum speed (regardless of rider input to accelerate further). Similarly, the safety constraint module 1020 can gently apply the brakes to trim speed if the AEB 100 exceeds the maximum speed constraint (for example, when coasting down a hill).

As described above, the rider characteristic module 1010 can determine if a rider is an "impaired rider." In some implementations, after detecting that a rider is impaired, the safety constraint module 1020 can take actions to get the rider appropriate assistance and prevent potential accidents or injuries due to the impaired rider. For example, the safety constraint module 1020 can disable or severely limit the AEB 100 by greatly reducing maximum speed. In some implementations, the safety constraint module 1020 gradually reduces maximum speed to zero. Similarly, the safety constraint module 1020 can notify the rider, make an audible announcement, alert the autonomous bicycle support server 280, emergency services, or other entities, or take other action to prevent an impaired rider from operating the AEB 100.

In addition to the safety constraint module 1020 the rider control module 220 can include a crash avoidance module 1030 which can implement a set of crash avoidance techniques to prevent or mitigate crashes or other accidents. In some implementations, the crash avoidance module 1030 can enable or disable individual crash avoidance techniques based on the rider skill profile determined by the rider characteristic module 1010 or based on a selection by the rider. The crash avoidance module 1030 can include electronic braking assist and stability control systems, according to some implementations. In some implementations, the crash avoidance techniques of the electronic braking assist and stability control systems can be disabled (manually or automatically) if the rider is determined to be an experienced rider by the rider characteristic module 1010. The braking assist and stability control systems can implement crash avoidance techniques based on data gathered from the performance sensor system 1050 (without requiring the use of the perception sensor system 1060), according to some embodiments.

The braking assist system can aid a rider in braking in various situations. For example, the braking assist system can include an electronic ABS (anti-lock braking system) which prevents wheel lockups under heavy braking by reducing braking force when wheelspin is detected. Similarly, the braking assist system can include an automatic brake balance system to prevent "over the bars" crashes (crashes where the AEB 100 pitches forward under heavy braking and throws the rider off of the front of the bicycle over the handlebars). For example, if the crash avoidance module 1030 detects a sudden forward pitch of the AEB 100 under heavy braking, the crash avoidance module 1030 can shift the brake balance towards the rear wheel 110 (reducing the brake pressure on the front wheel 130) to return the AEB 100 to a more neutral pitch and prevent the rider going over the handlebars. Similarly, the braking assist system can include a lowside prevention system to reduce "lowside" crashes (caused when one or both wheels loses traction during simultaneous braking and cornering) by preventing or reducing front braking power while cornering. Similarly, the stability control system can selectively apply braking or motor power to the front and rear wheels 110 and 130 to prevent loss of traction.

The crash avoidance module 1030 can also include features using the perception sensor system 1060. In some embodiments, the crash avoidance module can include lane keeping assist systems which can detect if the AEB 100 is drifting out of the bike lane or to the side of the road. The lane keeping assist system can provide steering pressure through the steering motor 125 to guide the rider towards the center of the lane. Similarly, the crash avoidance module 1030 can use the perception sensor system 1060 to detect an imminent crash (for example, by detecting an obstacle immediately in front of the AEB 100) and automatically apply the brakes to prevent or mitigate a collision. If a crash (or imminent crash) is detected by the AEB 100, the crash avoidance module 1030 can save camera footage collected by perception sensor system 1060 to provide a dashcam style recording of the crash and surrounding time. After a detected collision, the crash avoidance module 1030 can alert the autonomous bicycle support server 280, emergency services, or other entities of the detected crash.

The performance experiment module 1040 can perform performance experiments to determine rider characteristics, for example by intentionally overpowering a wheel of the AEB to determine surface traction. In some implementation, the performance experiments are performed while a rider is riding the AEB 100, but performance experiments can also be performed in autonomous mode, prior to the rider mounting the AEB 100.

Figure 11:
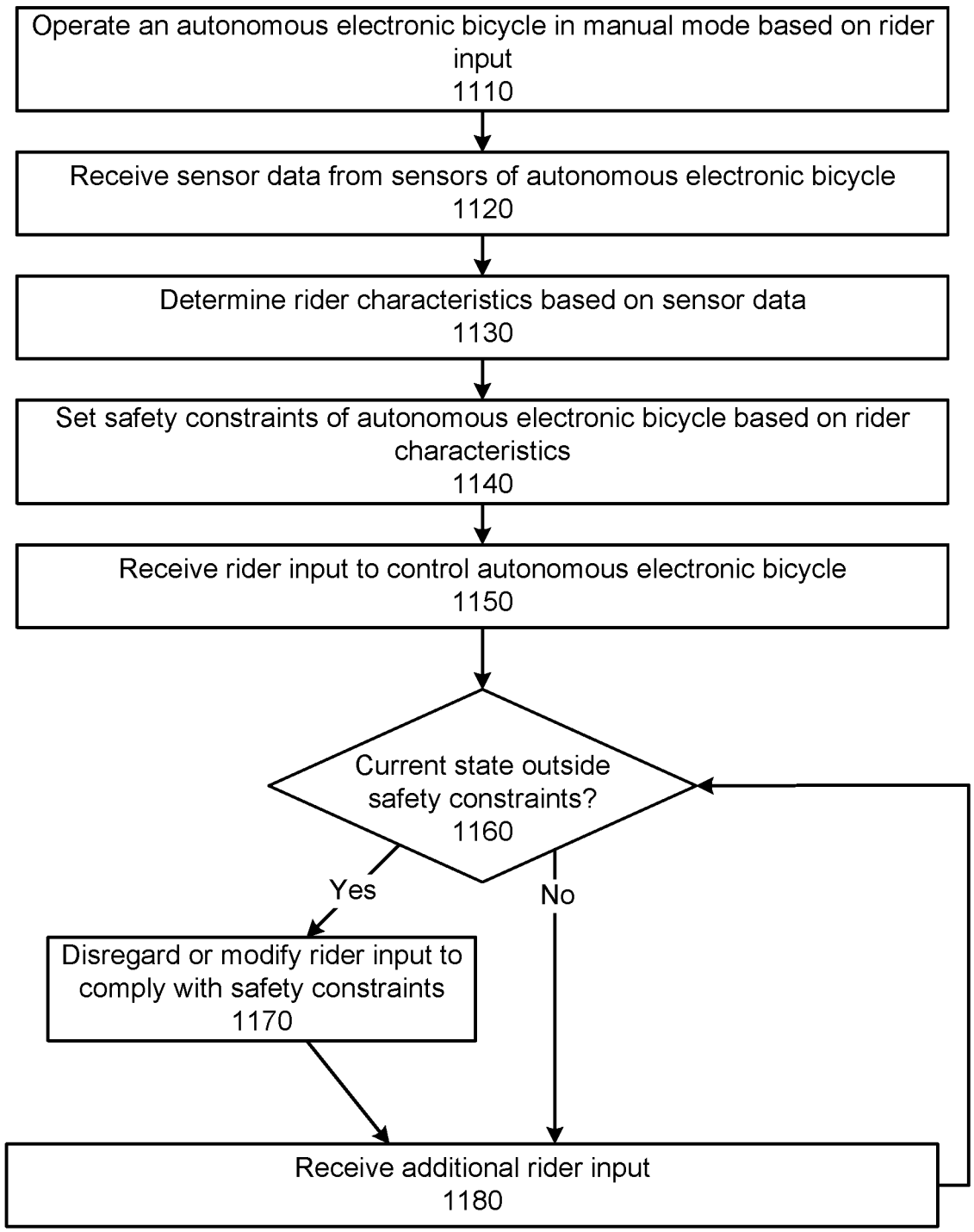
FIG. 11 is a flowchart illustrating a process for operating an autonomous electronic bicycle in manual mode according to safety constraints based on determined rider characteristics, according to an embodiment.

FIG. 11 is a flowchart illustrating a process for an autonomous electronic bicycle in manual mode according to safety constraints based on determined rider characteristics, according to an embodiment. The process 1100 begins when a bicycle control system of an autonomous electronic bicycle operates 1110 the AEB in manual mode (controlled by rider input). The bicycle control system receives 1120 sensor data from performance and perception sensors of the AEB and determines 1130 rider characteristics of the AEB from the received sensor data. For example, the rider characteristics can include a rider weight and a rider skill profile. Using the rider characteristics, the bicycle control system sets 1140 a set of safety constraints for the AEB based on the determined rider characteristics. As described above, safety constraints can include a maximum speed constraint and a maximum incline constraint (or disabling the AEB in response to an impaired ride). Then, while receiving 1150 rider control input for controlling the AEB, the bicycle control system can check 1160 if the AEB is currently within the implemented safety constraints. For example, the bicycle control system can disregard or modify 1170 the received rider input to stay within the safety constraints. Further received rider input can then be received 1180 and monitored according to step 1160.

Figure 12:
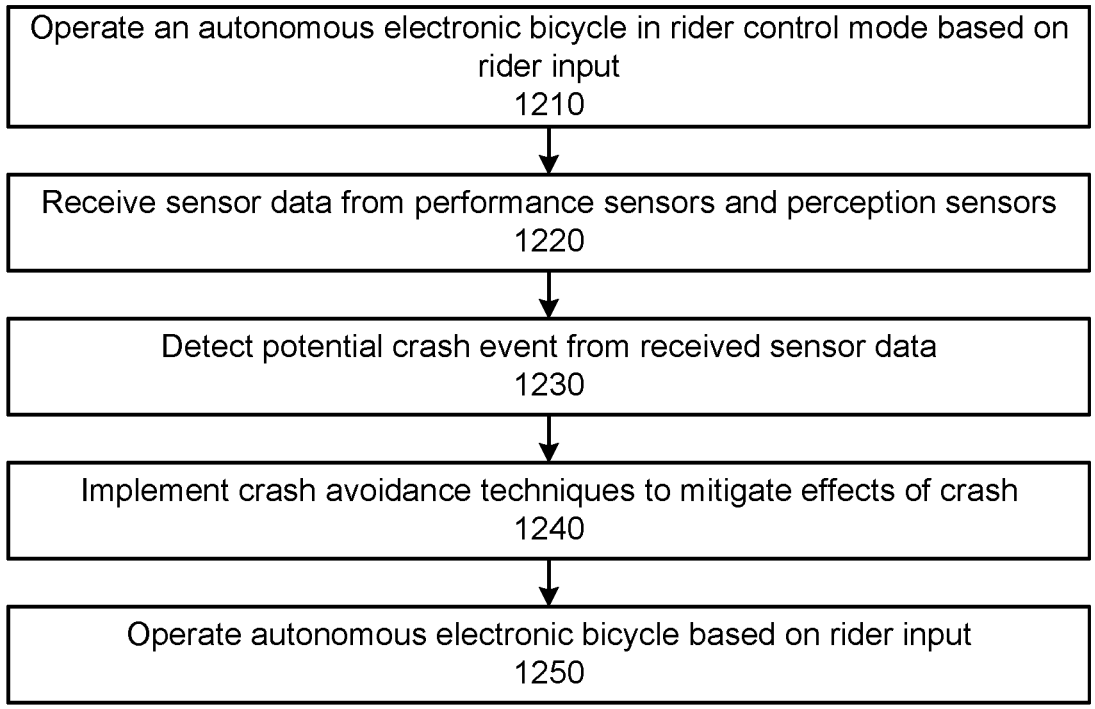
FIG. 12 is a flowchart illustrating a process for implementing safety constraints to mitigate the effects of a crash, according to an embodiment.

FIG. 12 is a flowchart illustrating a process for implementing safety constraints to mitigate effects of a crash event, according to an embodiment. The process 1200 begins when a bicycle control system of an autonomous electronic bicycle operates 1210 the AEB in manual mode (controlled by rider input). The bicycle control system receives 1220 sensor data from performance and perception sensors of the AEB and detects 1130 a potential crash event based on the received sensor data. The bicycle control system can then implement 1240 crash avoidance techniques to mitigate the effects of the crash. For example, the bicycle control system can alter the brake balance of the AEB based on the lowside prevention system. After the crash avoidance technique, the bicycle control system can then resume operating 1250 the AEB based on received rider input.

Conclusion

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method, comprising:
configuring an autonomous electronic bicycle to operate in an autonomous motion mode,
the autonomous electronic bicycle comprising:
a frame coupled to a front wheel and a rear wheel;
an electronic drive motor configured to drive one of the front wheel and the rear wheel;
an electronic steering motor configured to change an orientation of the front wheel relative to the frame responsive to an electronic input; and a controller configured to, when the autonomous electronic bicycle is operating in the autonomous motion mode, set the electronic drive motor to achieve a desired speed of travel and use the electronic steering motor to maintain the autonomous electronic bicycle's balance;

in response to a determination to operate the autonomous electronic bicycle in an autonomous pause mode, selecting, based on a current pose of the autonomous electronic bicycle, a balance mode transition sequence comprising a timed series of commands for the electronic drive motor and the electronic steering motor;

executing, by the electronic drive motor and the electronic steering motor, the balance mode transition sequence; and configuring the autonomous electronic bicycle to operate in the autonomous pause mode such that the autonomous electronic bicycle remains stationary and upright while operating in the autonomous pause mode.

2. The method of claim 1, wherein operating the autonomous electronic bicycle in the autonomous pause mode comprises configuring the autonomous electronic bicycle to perform a track stand.

3. The method of claim 2, wherein the controller is further configured to, when the autonomous electronic bicycle is operating in the autonomous pause mode, use the electronic steering motor to set a fixed steering angle and use the electronic drive motor to maintain the autonomous electronic bicycle's balance.

4. The method of claim 1, wherein the autonomous motion mode is associated with a first range of poses of the autonomous electronic bicycle for which the autonomous motion mode can be used to balance the autonomous electronic bicycle and the autonomous pause mode is associated with a second range of poses of the autonomous electronic bicycle for which the autonomous pause mode can be used to balance the autonomous electronic bicycle.

5. The method of claim 4, wherein the first range of poses of the autonomous electronic bicycle for which the autonomous motion mode can be used to balance the autonomous electronic bicycle and the second range of poses of the autonomous electronic bicycle for which the autonomous pause mode can be used to balance the autonomous electronic bicycle do not overlap.

6. The method of claim 1, wherein the balance mode transition sequence comprises a set of expected poses of the autonomous electronic bicycle, each expected pose associated with a point within the transition sequence.

7. The method of claim 6, wherein executing the balance mode transition sequence comprises comparing the current pose of the autonomous electronic bicycle against an expected pose of the balance mode transition sequence.

8. The method of claim 7, wherein executing the balance mode transition sequence further comprises performing feedback control when the current pose deviates from an expected pose of the balance mode transition sequence.

9. The method of claim 8, wherein performing feedback control comprises altering the transition sequence when the current pose deviates from an expected pose of the balance mode transition sequence by greater than a threshold amount.

10. The method of claim 1, wherein the balance mode transition sequence is determined based on a simulation of the autonomous electronic bicycle.

11. A non-transitory computer readable storage medium comprising instructions which, when executed by a processor, cause the processor to perform the steps of:

configuring an autonomous electronic bicycle to operate in an autonomous motion mode,
the autonomous electronic bicycle comprising:
a frame coupled to a front wheel and a rear wheel;
an electronic drive motor configured to drive one of the front wheel and the rear wheel;
an electronic steering motor configured to change an orientation of the front wheel relative to the frame responsive to an electronic input; and
a controller configured to, when the autonomous electronic bicycle is operating in the autonomous motion mode, set the electronic drive motor to achieve a desired speed of travel and use the electronic steering motor to maintain the autonomous electronic bicycle's balance;

in response to a determination to operate the autonomous electronic bicycle in an autonomous pause mode, selecting, based on a current pose of the autonomous electronic bicycle, a balance mode transition sequence comprising a timed series of commands for the electronic drive motor and the electronic steering motor;

executing, by the electronic drive motor and the electronic steering motor, the balance mode transition sequence; and configuring the autonomous electronic bicycle to operate in the autonomous pause mode such that the autonomous electronic bicycle remains stationary and upright while operating in the autonomous pause mode.

12. The non-transitory computer readable storage medium of claim 11, wherein operating the autonomous electronic bicycle in the autonomous pause mode comprises configuring the autonomous electronic bicycle to perform a track stand.

13. The non-transitory computer readable storage medium of claim 12, wherein the controller is further configured to, when the autonomous electronic bicycle is operating in the autonomous pause mode, use the electronic steering motor to set a fixed steering angle and use the electronic drive motor to maintain the autonomous electronic bicycle's balance.

14. The non-transitory computer readable storage medium of claim 11, wherein the autonomous motion mode is associated with a first range of poses of the autonomous electronic bicycle for which the autonomous motion mode can be used to balance the autonomous electronic bicycle and the autonomous pause mode is associated with a second range of poses of the autonomous electronic bicycle for which the autonomous pause mode can be used to balance the autonomous electronic bicycle.

15. The non-transitory computer readable storage medium of claim 14, wherein the first range of poses of the autonomous electronic bicycle for which the autonomous motion mode can be used to balance the autonomous electronic bicycle and the second range of poses of the autonomous electronic bicycle for which the autonomous pause mode can be used to balance the autonomous electronic bicycle do not overlap.

16. The non-transitory computer readable storage medium of claim 11, wherein the balance mode transition sequence comprises a set of expected poses of the autonomous electronic bicycle, each expected pose associated with a point within the transition sequence.

17. The non-transitory computer readable storage medium of claim 16, wherein executing the balance mode transition sequence comprises comparing the current pose of the autonomous electronic bicycle against an expected pose of the balance mode transition sequence.

18. The non-transitory computer readable storage medium of claim 17, wherein executing the balance mode transition sequence further comprises performing feedback control when the current pose deviates from an expected pose of the balance mode transition sequence.

19. The non-transitory computer readable storage medium of claim 18, wherein performing feedback control comprises altering the transition sequence when the current pose deviates from an expected pose of the balance mode transition sequence by greater than a threshold amount.

20. The non-transitory computer readable storage medium of claim 11, wherein the balance mode transition sequence is determined based on a simulation of the autonomous electronic bicycle.

* * * * *